United States Patent [19]

Isfeld et al.

[11] Patent Number: 5,483,640
[45] Date of Patent: Jan. 9, 1996

[54] SYSTEM FOR MANAGING DATA FLOW AMONG DEVICES BY STORING DATA AND STRUCTURES NEEDED BY THE DEVICES AND TRANSFERRING CONFIGURATION INFORMATION FROM PROCESSOR TO THE DEVICES

[75] Inventors: Mark S. Isfeld; Bruce W. Mitchell, both of San Jose, Calif.

[73] Assignee: 3Com Corporation, Santa Clara, Calif.

[21] Appl. No.: 23,927

[22] Filed: Feb. 26, 1993

[51] Int. Cl.$^6$ .................................................. G06F 13/00
[52] U.S. Cl. ................... 395/200.03; 395/857; 395/500; 364/228.5; 364/238.3; 364/931.47; 364/DIG. 1
[58] Field of Search ..................... 395/200, 275, 395/325, 500, 600, 650; 370/28, 85.2, 85.13, 85.14, 94.1, 60

[56] References Cited

U.S. PATENT DOCUMENTS

| | | | |
|---|---|---|---|
| 4,475,155 | 10/1984 | Oishi et al. | 364/200 |
| 4,783,730 | 11/1988 | Fischer | 364/200 |
| 4,860,244 | 8/1989 | Bruckert et al. | 364/900 |
| 5,109,484 | 4/1992 | Hughes et al. | 395/200 |
| 5,131,081 | 7/1992 | MacKenna et al. | 395/275 |
| 5,255,387 | 10/1993 | Arnold et al. | 395/600 |
| 5,404,524 | 4/1995 | Celi, Jr. | 395/500 |

*Primary Examiner*—Thomas C. Lee
*Assistant Examiner*—Moustafa Mohamed Meky
*Attorney, Agent, or Firm*—Haynes & Davis

[57] ABSTRACT

An internetwork device which manages the flow of packets of I/O data among a plurality of network interface devices includes a bus coupled to the plurality of network interface devices, a core memory storing only packets of I/O data and control structures needed by the plurality of network interface devices, and a processor including local memory isolated from the core memory storing routines and internetwork information involved in updating control structures and control fields in the packets of I/O data to direct movements of packets of I/O data among the plurality of network interface devices. A bus-memory interface is provided through which transfers of packets of I/O/data and control structures used by the plurality of network interface devices are conducted between the core memory and the bus. A processor-memory interface is provided through which transfers of data to or from control structures or control fields in packets of I/O data are conducted between the core memory and the processor. Finally, a processor-bus interface is included through which configuration information concerning control structures and I/O data buffers in the core memory are transferred between the plurality of network interface devices and the processor across the bus. The processor-bus and processor-memory interfaces include structures for decoupling processor accesses to configuration stores in the plurality network interface devices and to the core memory from contention with bus-memory interface transfers between the core memory and the plurality of network interface devices.

30 Claims, 10 Drawing Sheets

SYSTEM FOR MANAGING DATA FLOW AMONG DEVICES BY STORING DATA AND STRUCTURES NEEDED BY THE DEVICES AND TRANSFERRING CONFIGURATION INFORMATION FROM PROCESSOR TO THE DEVICES

BACKGROUND OF THE INVENTION

1. Field of the Invention

The present invention relates to computer systems managing large amounts of input/output data, such as internetwork controllers and the like; and particularly to an architecture optimized for bridging, routing, and gateway internetwork functions serving a plurality of different types of networks.

2. Description of Related Art

Internetwork devices, such as bridges, routers, and gateways, often cause a significant bottleneck when communicating data through networks. The processing resources available at the internetwork device has a direct impact on the latency of messages being communicated among the networks. When there are a number of high speed networks connected to a single internetwork device, the processing resources of the internetwork device can be easily overwhelmed.

Techniques for managing the large amounts of I/0 for such internetwork devices include providing a very large memory which can accumulate a lot of I/O data while the internetwork processor executes time consuming procedures that may prevent it from routing a particular packet of data, and increasing the processing power of the internetwork processor.

For high throughput systems, a very large memory can be quite expensive. Similarly, techniques involving multiple processors or very high performance processors that manage the internetworking functions are also expensive. Furthermore, contention between the I/O data transfers to and from the memory and accesses by the processor to the memory limit the effectiveness of increasing memory size or processing power.

Accordingly, there is a need for an architecture for managing large amounts of I/O, such as required in internetwork devices, which significantly increases the bandwidth of the internetwork device.

SUMMARY OF THE INVENTION

The present invention provides an architecture for managing large amounts of input/output data flow which greatly improves on performance and features available in prior art systems. The invention is based on the recognition that the central element in a family of internetwork products is not a processor, but a network buffer memory. The buffer memory, called herein the core memory, is optimized according to the present invention to provide a high speed memory service to allow large amounts of data to be sent to and received from various networks or other I/O devices. The core memory is used for storing only packets of I/O data and control structures that are needed by the I/O devices. Drivers, tables, descriptors, and other information are held in local processor memory isolated from the core memory. The number of processor accesses to the core memory is limited and the accesses are decoupled from contention with the I/O data transfers using caching and buffer techniques.

Thus, the present invention can be characterized as an apparatus for managing data flow among a plurality of input/output devices. The core memory stores I/O data buffers and control structures needed by the input/output devices. A processor, including local memory isolated from the core memory, and storing control information and instructions used by routines managing data flow among the input/output devices, performs I/O control functions. A first memory interface is responsive to the plurality of input/output devices, for transferring I/O data and control data between the input/output devices and the I/O data buffers and control structures in the core memory. A second memory interface responsive to the processor is used for transferring control data for control structures and control fields in I/O data buffers between the core memory and the processor.

The second memory interface for transfers between the processor and the core memory includes structures for decoupling processor accesses to the core memory from contention with transfers between the core memory and the plurality of input/output devices through the first memory interface. These structures include a read cache and a write buffer, which are managed to optimize the speed of reading or writing from the core memory of control fields and control structures which typically reside in sequential addresses in the core memory.

The apparatus also includes a configuration interface, coupled with a plurality of input/output devices and the processor, through which the processor supplies configuration information to the plurality of input/output devices. The configuration interface uses a write buffer to decouple processor accesses to the plurality of input/output devices from contention with I/O data transfers.

The present invention is particularly suited to internetwork devices which manage the flow of packets of I/O data among a plurality of network interface devices coupled to respective networks. In this aspect, the apparatus includes a bus coupled to the plurality of network interface devices, a core memory storing only packets of I/O data and control structures needed by the plurality of network interface devices, and a processor including local memory isolated from the core memory storing routines and internetwork information involved in updating control structures and control fields in the packets of I/O data to direct movements of packets of I/O data among the plurality of network interface devices.

A bus-memory interface is provided through which transfers of packets of I/O/data and control structures used by the plurality of network interface devices are conducted between the core memory and the bus. Also, a processor-memory interface is provided through which transfers of data to or from control structures or control fields in packets of I/O data are conducted between the core memory and the processor. Finally, a processor-bus interface is included through which configuration information concerning control structures and I/O data buffers in the core memory are transferred between the plurality of network interface devices and the processor across the bus.

The processor-bus and processor-memory interfaces include structures for decoupling processor accesses to configuration stores in the plurality network interface devices and to the core memory from contention with bus-memory interface transfers between the core memory and the plurality of network interface devices. These decoupling structures include a read cache and a write buffer. The read cache stores a plurality of words from plurality of sequential addresses in the core memory. The cache manager maintains words in the read cache using burst mode transfers from the plurality of sequential addresses in core memory.

Similarly, the write buffer stores a plurality of words for writes from the processor to a plurality of sequential addresses in the core memory. A buffer manager writes words from the write buffer to the core memory with burst mode transfers to the plurality of sequential addresses.

Accordingly, the present invention provides an architecture which optimizes use of the core memory by providing optimized access by network interface devices to the core memory, by optimizing the interface between the processor in the core memory, and by isolating processor local memory from the core memory during the procedures involved in directing the flow of packets among the networks coupled to the system. The architecture achieves greatly improved throughput and allows enhanced features over prior art internetwork devices.

Other aspects and advantages of the present invention can be seen upon review of the figures, the detailed description, and the claims which follow.

DESCRIPTION OF THE PREFERRED EMBODIMENTS

Figure 1:
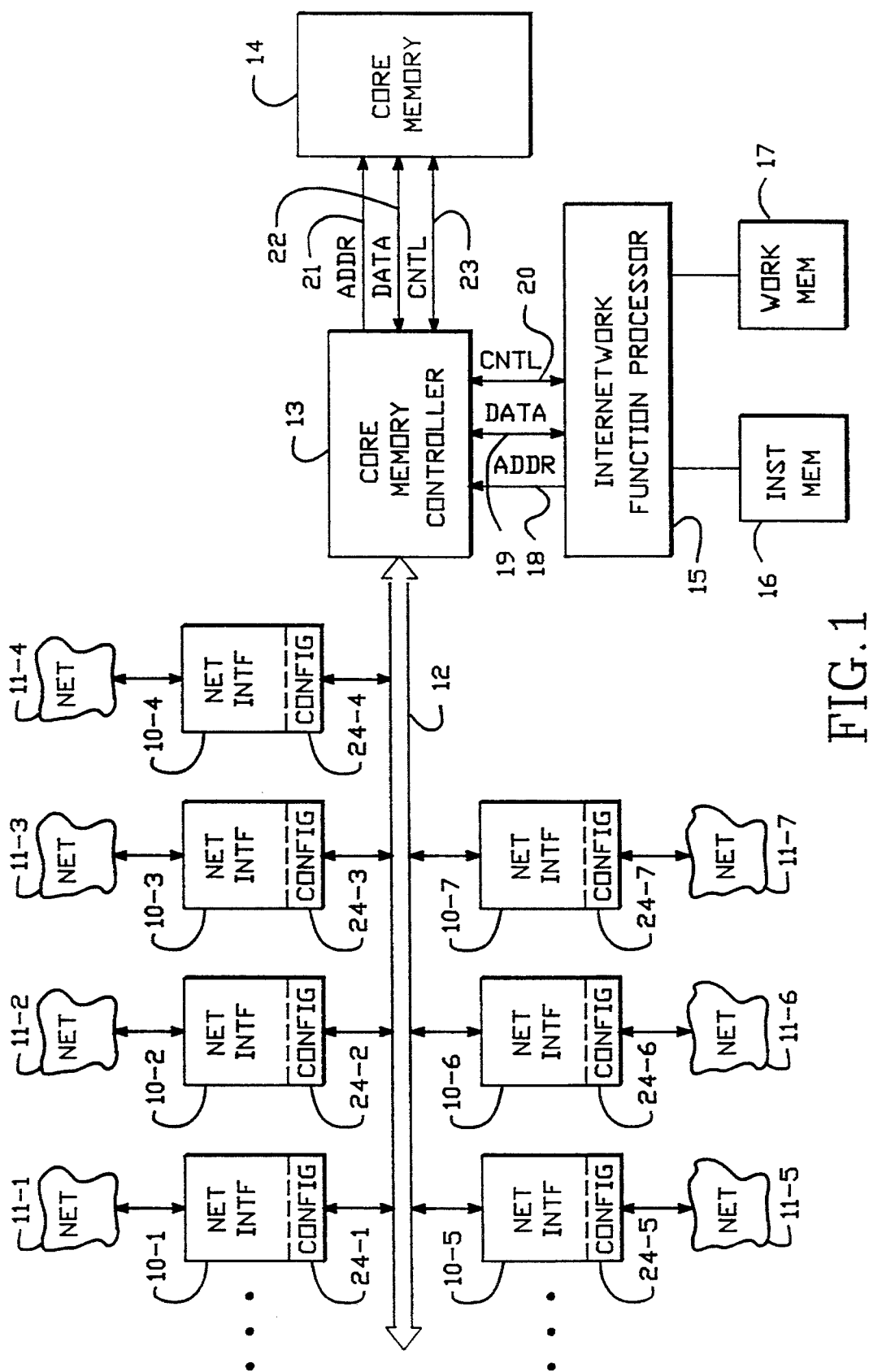
FIG. 1 is an overview block diagram of an internetworking system according to the present invention.
Figure 2:
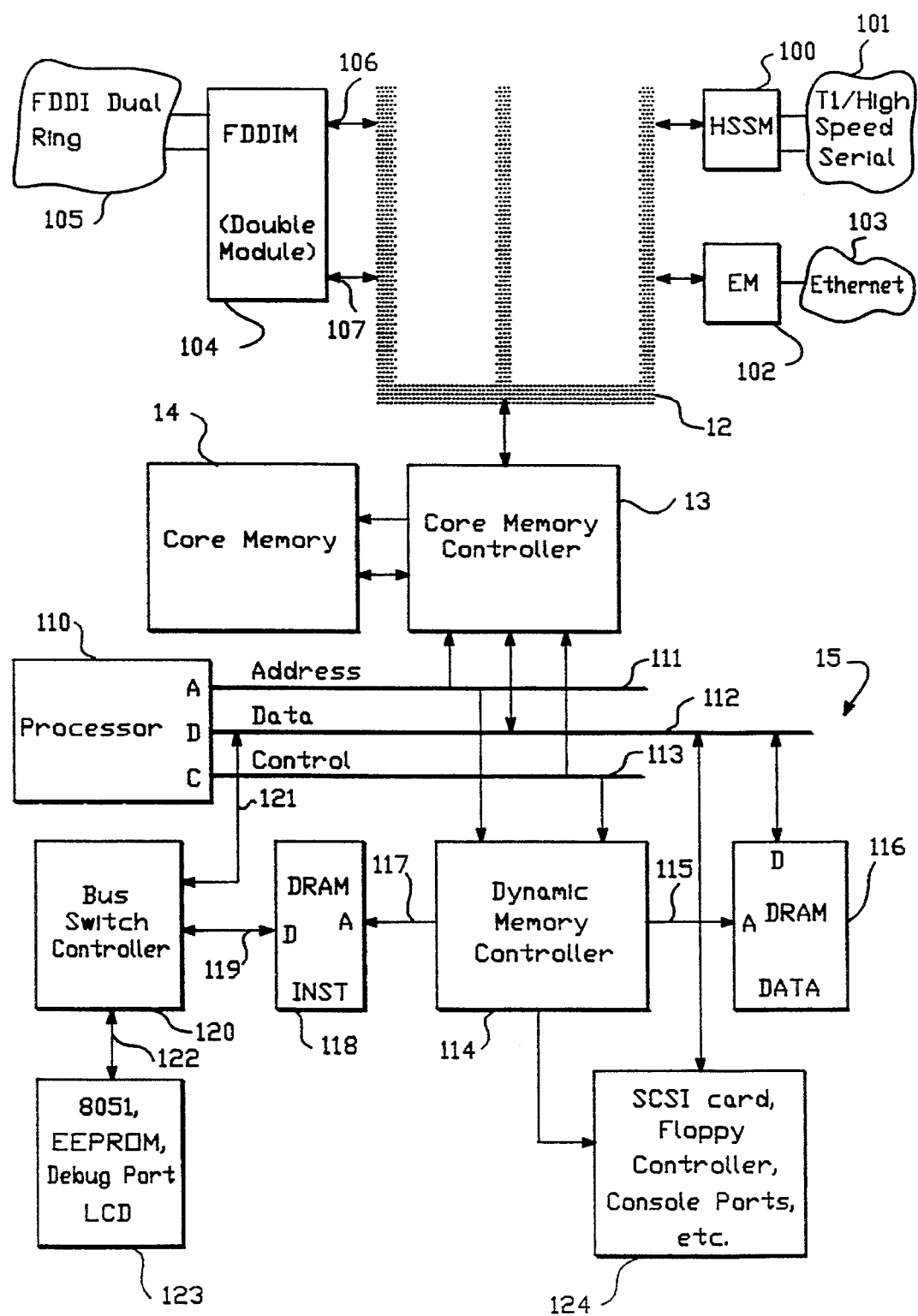
FIG. 2 is a system level block diagram showing a preferred embodiment of an internetwork processor according to the present invention.
Figure 13:
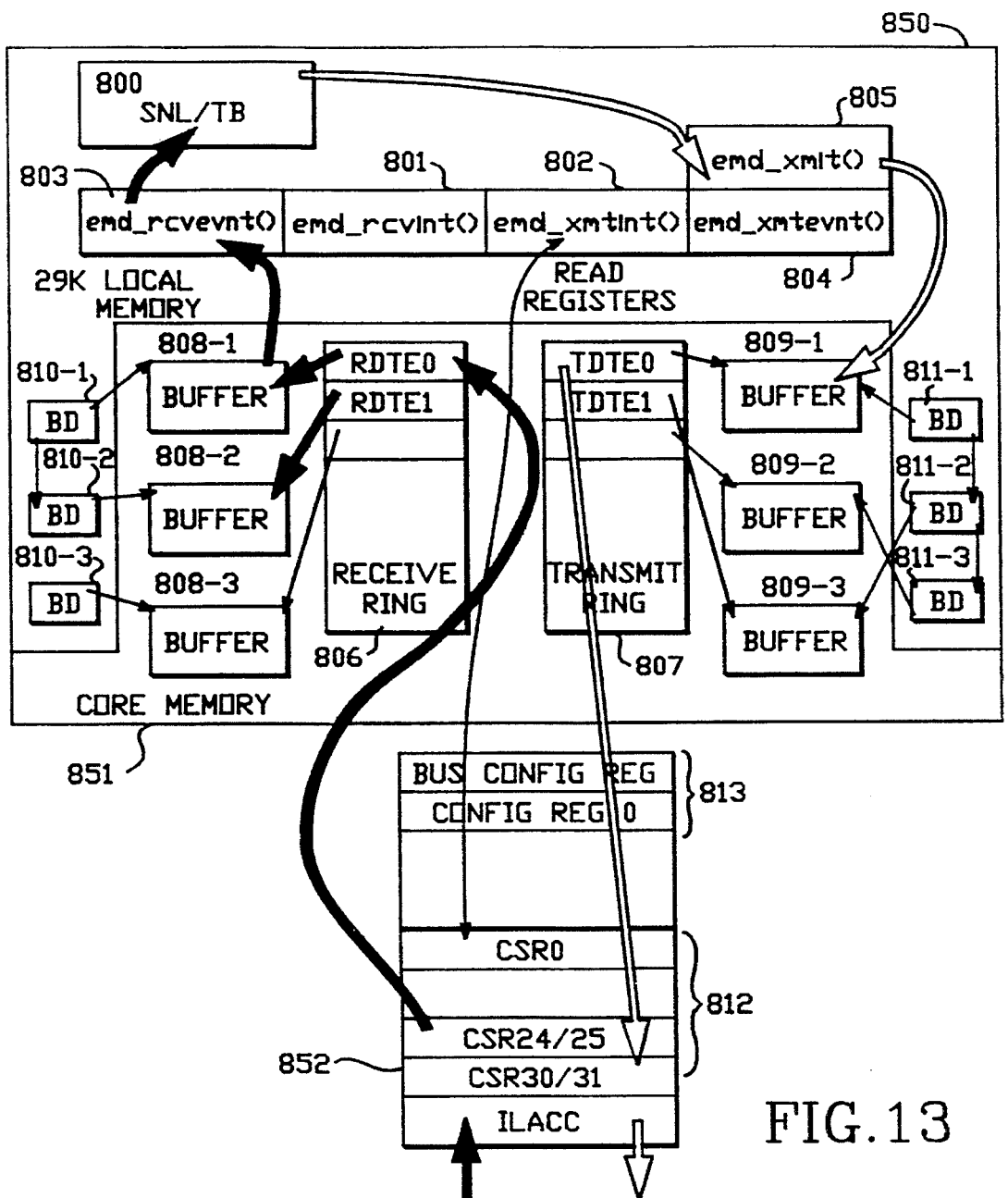
FIG. 13 is a schematic diagram of the software architecture for a driver which executes internetwork functions in the processor of the present invention.
Figure 14:
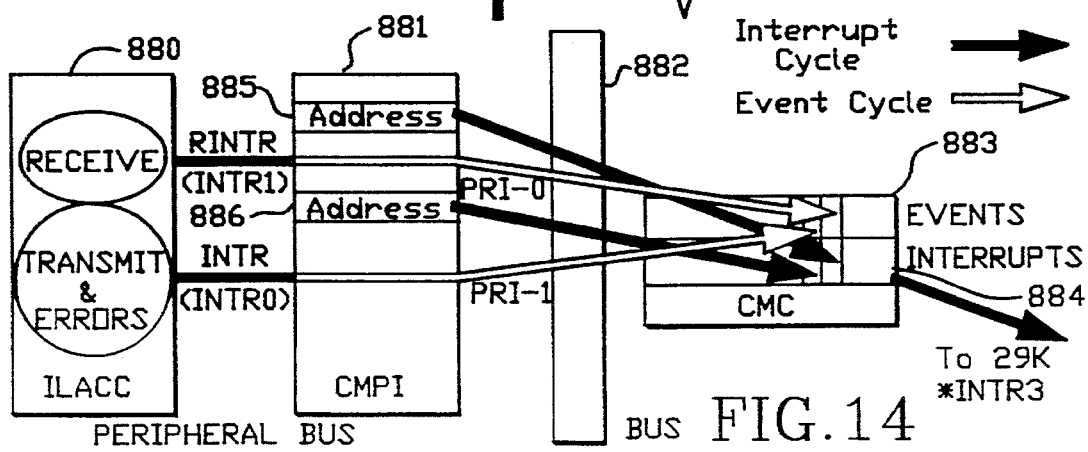
FIG. 14 is a block diagram of the interrupt structure for the driver of FIG. 13.

A detailed description of preferred embodiments of the present invention is provided with respect to the figures. FIGS. 1 and 2 provide an overview of the system architecture. FIGS. 3–12 provide information concerning a specific implementation of the core memory controller for a system according to FIGS. 1 and 2. FIGS. 13–14 illustrate an example partitioning of data and software for an ethernet network driver in one embodiment of the system of FIGS. 1 and 2.

I. System Overview (FIGS. 1 and 2)

FIG. 1 illustrates the architecture of an internetwork system according to the present invention. The system includes a plurality of network interface devices labelled 10-1 through 10-7, that are coupled to respective networks 11-1 through 11-7. Each of the plurality of network interface devices 10-1 through 10-7 is coupled to an I/O bus 12. The bus 12 is also connected to a core memory controller 13 through which access to a core memory 14 is provided. Also coupled to the core memory controller 13 is an internetwork function processor 15 having instruction memory 16 and working memory 17. The internetwork function processor 15 supplies addresses on line 18, data on line 19, and control on line 20 to the core memory controller 13 for the purpose of reading and writing data in the core memory 14, and communicating with the network interface devices 10-1 through 10-7 across the bus 12.

Similarly, the core memory controller 13 is coupled to the core memory 14 across address lines 21, data lines 22, and control lines 23 for accesses by the internetwork function processor 15 and the plurality of network interface devices across the bus 12 to the core memory 14.

Each of the network interface devices coupled to the bus 12 includes a relatively intelligent network device which communicates across the bus 12 with buffers and control structures in the core memory 14, using configuration information in respective configuration stores 24-1 through 24-7. The internetwork function processor 15 is responsible for setting up the configuration information in the configuration stores 24-1 through 24-7 by communicating across the bus 12.

Each network interface device has specific needs for buffers and control structures in order to carry out the network interface function. All of these buffers and control structures that are needed by the interface devices are kept in the core memory 14. All other data in the system is maintained by the instruction memory 16 and working memory 17 of the internetwork function processor 15.

Using this architecture, the internetwork function processor may perform internetworking routines using the instruction memory 16 and working memory 17 without suffering wait states due to contention with the network I/O transfers into and out of the core memory. Only when the internetworking routine requires control information from the control structures or control fields in the packets of network data, are accesses by the internetwork function processor necessary to the core memory 14.

FIG. 2 illustrates the internetworking system of FIG. 1 with a more detailed block diagram of the internetwork function processor according to the present invention. As in FIG. 1, the system includes an I/O bus 12 which is coupled to a core memory controller 13. The core memory controller 13 is in turn coupled to core memory 14. On the I/O bus 12, a plurality of network interface devices are included. For example, a high speed serial interface device 100 coupled to a T1 or other high speed serial network 101 is connected to bus 12. An ethernet module 102 coupled to an ethernet local area network 103 is coupled to the bus 12. Similarly, an FDDI network interface device 104 coupled to an FDDI dual ring network 105 is coupled to the bus 12 across dual ports 106 and 107.

These network interfaces are representative of a plurality of different types of network interface devices which may be coupled to the bus 12 at a single time. Each of these devices includes an intelligent network interface chip (circuit). For instance, the ethernet module 102 may include an ILACC ethernet controller Am79C900, manufactured by Advanced Micro Devices, Inc., of Sunnyvale, Calif. The high speed serial module may include a Motorola MC68605 high speed serial controller manufactured by Motorola, Inc., of Phoenix, Ariz. A token ring module may include a TMS380 token ring controller manufactured by Advanced Micro Devices, Inc. The FDDI module 104 may include a 68839 FDDI controller manufactured by Motorola. Each of these devices needs specific memory resources to store input/output buffers and control structures to support their network interface functions. For instance, control structures like receive and transmit buffer descriptor rings may be maintained in the core memory 14 to support specific devices. Other devices may maintain lists of buffer descriptors for use in the network interface functions. In addition to the rings and lists of control structures, the actual buffers that these devices load packets of I/O data into are provided in the core memory 14.

The core memory controller is also coupled to the internetwork function processor, generally 15. The internetwork function processor 15 in this embodiment is based on a high performance RISC processor 110, such as the Am29000 microprocessor manufactured by Advanced Micro Devices, Inc., of Sunnyvale, Calif. The 29000 processor ("29K") is coupled to an address bus 111, a data bus 112, and a control bus 113. The address and control buses 111 and 113 are coupled to a dynamic memory controller 114. The dynamic memory controller supplies addresses and control on line 115 to a data memory 116, and supplies address and control information on line 117 to an instruction memory 118. The data and instruction memories 116, 118 are implemented using high speed dynamic random access memory. In one embodiment, there may be more than one megabyte of DRAM in each the data and instruction memories 116, 118. Data from the data memory 116 is coupled directly to the data bus 112 of the processor 110. Data from the instruction memory 118 is supplied on line 119 to a bus switch controller 120, and through the bus switch controller across line 121 to the data bus 112. The bus switch controller is also coupled across line 122 to a diagnostic processor 123 consisting of a microprocessor such as the 8051 manufactured by Intel, boot memory stored in EEPROM, debug port hardware, LCD display, and other diagnostic and support units as necessary generally represented by block 123. During normal operation, the bus switch controller 120 is set up to select instructions from the instruction memory 118 and couples it to processor 110 across line 125.

The bus switch controller is a simple high speed bus switch which is used instead of tristate outputs to prevent contention on the two 29000 processor buses (112, 125) and the diagnostic processor. The dynamic memory controller 114 provides memory control to the processor 110 for accesses to the data memory 116 and the instruction memory 118 to enhance performance of the processor. Also coupled to the data memory and the dynamic memory controller 114 are user interface components 124, including a floppy disc controller and floppy disc, console ports, etc.

Instruction memory 118 includes software to provide bridging, routing, and gateway functions to the network interface devices on the bus 12. Representative software which may be supported by the system include the following:

1. Mailbox driver;
2. ethernet driver;
3. T1 driver;
4. token ring driver;
5. FDDI driver;
6. other network interface drivers;
7. OSI route protocol;
8. OSI route function;
9. IP route function;
10. LLC/SNAP protocol;
11. user interface;
12. kernel file system;
13. 29000 kernel;
14. protocol stacks (TCP, OSI);
15. IP route protocol;
16. link management;
17. MAC level routing;
18. other MAC level drivers; and
19. diskette driver.

This software architecture provides bridging, routing, and gateway functions. Packets will be received by the MAC level drivers of which 2, 3, 4, and 5 are examples. This module consults the LLC/SNAP protocol to determine the protocol of the packet involved. This information along with the MAC level address table will determine the packet destination and the packet will be placed into the correct outgoing MAC mailbox. If the LLC/SNAP indicates a network level packet type, and this type is recognized as a routable protocol, and the software is configured to network level route that protocol, the software will examine network level addressing in the packet header to determine the packet destination. In either case, the packet may need to be modified before being queued at the outgoing mailbox. If the packet is destined for this box, it will be passed to the appropriate protocol step. Otherwise, there is no need for the packet and it will be discarded.

Actual accesses to the packet control fields and control structures in the core memory 14 necessary to support the software architecture are relatively limited. Almost all of the data and instructions necessary for these routines will be maintained in the data memory 116 and the instruction memory 118, isolated from the core memory 14.

Thus, it can be seen that the core memory 14 is driven by a core memory controller 13 which has a processor-to-memory interface, a bus-to-memory interface, and a processor-to-bus interface. The host processor 15 uses the processor-to-bus interface to communicate configuration information to the plurality of network interface devices coupled to the bus 12. The network interface devices coupled to the bus 12 use the configuration information to read and write control structures and I/O data into data buffers in the core memory 14.

Receive and transmit events are signalled to processor 15 by the network interface devices according to any one of a plurality of interrupt or event signalling techniques. In the preferred system, such technique is implemented as described in our co-pending U.S. patent application entitled A SYSTEM FOR SERVICING I/O EVENTS, invented by Isfeld, Ser. No. 07/982,876, filed Nov. 30, 1992, which was owned at the time of invention and is currently owned by the same Assignee as the present application, and which is incorporated by reference as if fully set forth herein. The processor 15 accesses the core memory 14 only as necessary to retrieve control information from control fields in the packets of I/O data or from control structures in the memory 14 which are assigned to the given network interface device. Using the resources that are isolated from the core memory in the data memory 116 and instruction memory 118, the processor performs the internetworking routines, and updates the control fields or control structures in the core memory 14 as necessary to direct the flow of I/O data packets among the networks.

II. Core Memory Controller Architecture (FIGS. 3–12)

A preferred embodiment of the core memory controller is illustrated with respect to FIGS. 3–12. This embodiment is optimized for a single port DRAM memory array of up to 4 megabytes for use as the core memory. Other types of memory devices and interfaces can be implemented as suits the needs of a particular application.

Figure 3:
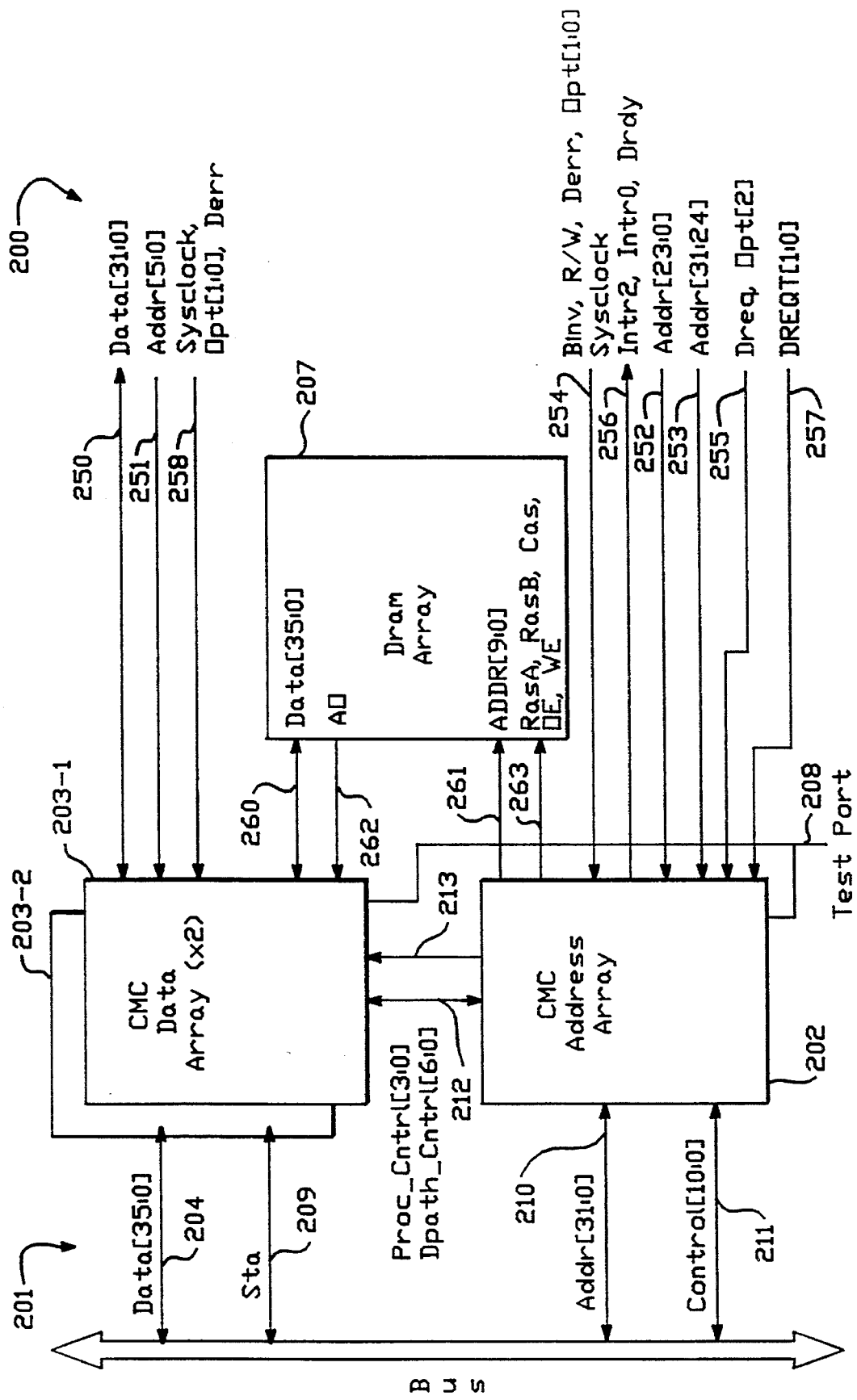
FIG. 3 is a block diagram of one implementation of the core memory controller showing the processor and core bus interfaces.

FIG. 3 illustrates the 29000 processor interface on the right side of the figure, generally 200, and the bus interface on the left side of the figure, generally 201. The core memory controller (CMC) consists of a set of custom gate array integrated circuits designed using the Verilog design tools available from Cadence, compiled using HDL compiler from SYNOPSYS, verified using MDE design tools available through LSI Logic of Fremont, Calif., and manufactured using a 1 micron IC process available from same. These chips include a core memory controller address array 202 and a pair of core memory controller data array arrays 203-1, 203-2. The data array chips 203-1 and 203-2 are identical and support 16 bit plus two parity bit data paths each for a total of a 36 bit data path on line 204 on the bus interface 201.

A DRAM array 207 is coupled to both the data array chips 203-1, 203-2 and the address array chip 202 to provide the core memory.

The 29000 interface signals include the signals set out in Table 1 as follows:

TABLE 1

| 29000 INTERFACE SIGNALS | | | |
|---|---|---|---|
| Signal Name | Purpose | # Bits | Ref # |
| Data | Data Movement | 32 | 250 |
| Addr | Address Requests | 32 | 251, 252, 253 |
| *Binv | Bus Invalid | 1 | 254 |
| R/W | Read/Write Request | 1 | 254 |
| *Dreq | Data Request | 1 | 255 |
| *Drdy | Data Ready | 1 | 256 |
| *Derr | Data Error | 1 | 254,258 |
| Opt[2:0] | Option bits (byte/word etc.) | 3 | 254, 255, 258 |
| DREQT[1:0] | Data Request Type (I/O Data) | 2 | 257 |
| *Intr0 | Interrupt 0 (high priority) | 1 | 256 |
| *Intr2 | Interrupt 2 | 1 | 256 |
| Sysclock | 29000 System Clock | 1 | 254, 258 |

The DRAM signals which are supplied by the CMC address array 202 and the CMC data arrays 203-1, 203-2, to the DRAM array 207 include the following signals set out in Table 2.

TABLE 2

| Signal Name | Purpose | # Bits | Ref # |
|---|---|---|---|
| Data[35:0] | Data and Parity | 36 | 260 |
| A[9:0] | Multiplexed Address | 10 | 261, 262 |
| *WE | Write Enable | 1 | 263 |
| *RASA,B | Row Address Strobe | 2 | 264 |
| *CAS | Column Address Strobe | 1 | 265 |
| *OE | Output Enable | 1 | 266 |

In addition, a test port line 208 is included for the purpose of diagnostics.

The bus interface, generally 201, includes the 36 bit data path on line 204, such status information as errors, signals, clocks, data ready signals, and the like on line 209, address signals on line 210, and control signals on line 211. Note that lines 204, 210, and 211 are time multiplexed onto the same signal lines.

The bus according to a preferred embodiment of the present invention is described in co-pending U.S. patent application entitled BACKPLANE BUS ARCHITECTURE WITH PARALLEL ARBITRATION, invented by Isfeld, et al., filed on the same date as the present application, and incorporated by reference herein. However, any suitable bus may be used as suits the needs of a particular design.

CMC address array 202 is responsive to the control information in lines 253, 255, 257, and 254, and directs the accesses to the core memory, to the bus, to local configuration and control registers, and the like as appropriate.

Figure 4:
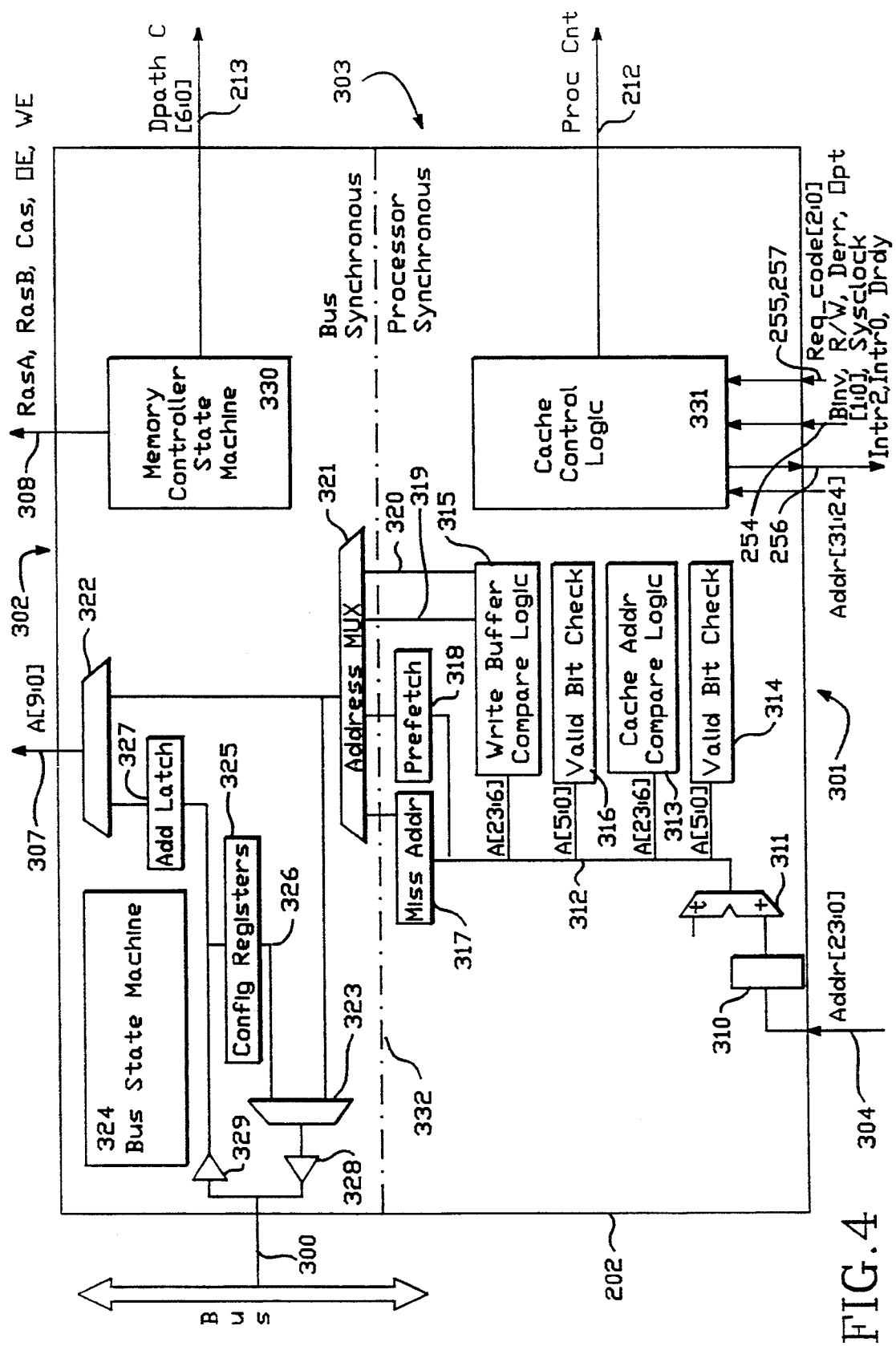
FIG. 4 is a block diagram of the CMC address array of FIG. 3.

Between the CMC address array and the CMC data array 203-1, 203-2, data path control signals and process control signals are provided across lines 212 and 213, respectively. A more detailed block diagram of the CMC address array is provided in FIG. 4. As can be seen in FIG. 4, the CMC address array 202 includes a bus interface generally 300, a processor interface generally 301, a DRAM interface generally 302, and a CMC data array interface generally 303. The processor interface 301 receives as inputs the address [31:0] on line 304, 29000 control signals on lines 254, 255, and 257. The interface supplies interrupt and data ready signals to the 29000 across line 306. The CMC data array interface 303 supplies a process control signals on line 212, and the data path control signals on line 213. The DRAM interface 302 supplies address bits [9:0] on line 307, and DRAM control signals including RAS, CAS, output enable, and write enable signals on line 308.

The address signal on line 304 is supplied to an address register 310. The address register 310 is coupled to an incrementer logic block 311. The output of the incrementer logic block 311 is supplied on an address bus 312. The address bus supplies cache address compare logic 313, valid bit check logic 314, write buffer compare logic 315, and valid bit check logic 316. The bus 312 is also coupled to a write buffer and cache miss register 317, and a pre-fetch register 318 for supporting the cache. Also, the write buffer compare logic 315 supplies addresses on lines 319 and 320. The output of the miss address register 317, the pre-fetch register 318, and the addresses on lines 319 and 320 are supplied to address multiplexer 321. Address multiplexer selects one of the four addresses for supply to a DRAM address MUX 322 and a bus address MUX 323.

The bus is driven by a bus state machine 324. Bus state machine 324 controls bus configuration registers 325. The bus configuration registers 325 may supply addresses on line 326 to multiplexer 323. The output of multiplexer 323 is supplied through driver 328 to the bus interface 300. Incoming addresses from the bus interface 300 are supplied through driver 329 to address latch 327, and to selector 322. The output of selector 322 is supplied on line 307 as the DRAM addresses.

The CMC address array also includes a memory controller state machine 330 and cache control logic 331.

A synchronization boundary, generally 332, is shown in the figure. Generally, the address paths prior to multiplexer 321 are synchronous with the processor system clock (SYSCLOCK) while the address paths from multiplexer 321 to the bus interface 300 or the DRAM interface 307 are synchronous with the bus clock. Also, the memory controller state machine 330 is bus synchronous, and the cache control logic 331 is processor synchronous.

Figure 5:
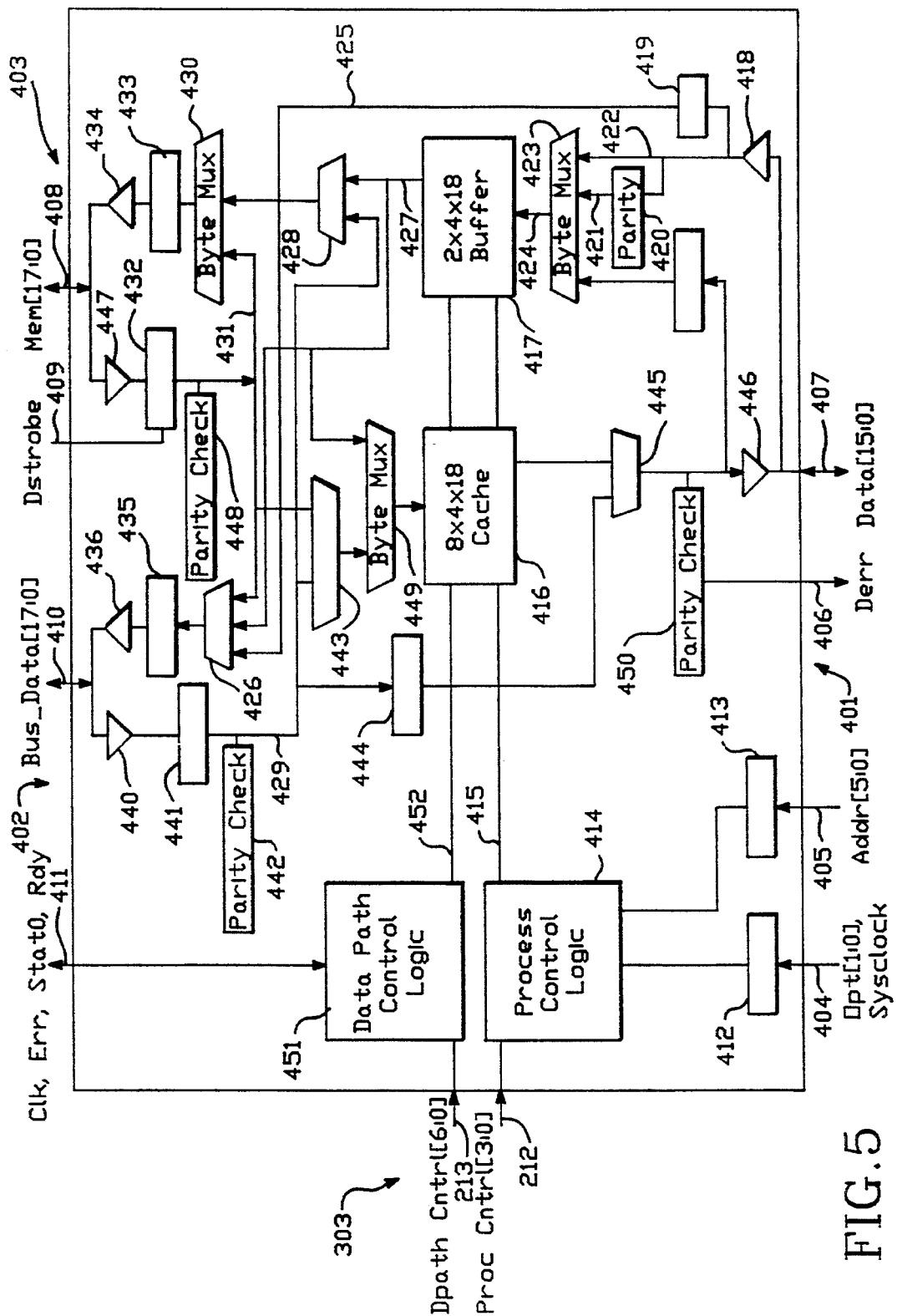
FIG. 5 is a block diagram of the CMC data array of FIG. 3.

The CMC data array is illustrated in FIG. 5. It also includes generally a processor interface 401, a bus interface generally 402, a DRAM interface generally 403, and an interface to the address array, generally 303.

The 29000 interface 401 includes the control signals on line 404, and address signals [5:0] on line 405. A data error signal on line 406 and the data [15:0] on line 407 are supplied as outputs to the 29000 data bus.

The bus interface includes an 18 bit data path 408 for memory bits [17:0] and a data strobe signal on line 409. The bus interface 402 includes an 18 bit data path on line 410, and control information on lines 411. An identical second chip is included to expand the interface from 18 to 36 bits, including one parity bit for each 8 bit byte of data.

The 29000 supplies the control signals on line 404 and the low order address on line 405 to respective input latches 412 and 413. The input latches 412 and 413 are coupled to process control logic 414. Process control logic 414 also receives the process control signal [3:0] from the address array chip on line 212. Process control logic 414 generally controls the processes executed by the chip as indicated on line 415 which is coupled to a read cache 416 and a write buffer 417. The read cache 416 stores 8 lines of four 18 bit words. The write buffer 417 stores two lines of four 18 bit words.

Incoming data from the 29000 data bus is supplied on line 407 through driver 418 to line 422 and into data latch 419. Data latch 419 operates as a control word buffer supplying line 425 to the bus data interface. Also, data from driver 418 is supplied through parity logic 420 to generate a parity bit on line 421, and across line 422 to a byte multiplexer 423. Output of the byte multiplexer 423 is supplied on line 424 to the write buffer 417. From the write buffer 417, data is supplied on line 427 to selector 428. Second input to selector 428 is data on line 429 from the bus interface. The output of selector 428 is supplied to a byte multiplexer 430 which may select data also across line 431 from the DRAM read register 432. The output of byte multiplexer 430 is supplied to a DRAM write register 433 and through driver 434 to the DRAM memory on line 408.

Alternatively, the output of the write buffer 417 may be supplied on line 427 to the bus selector 426. A third input to bus selector 426 is data from the output of the DRAM read register 432. The output of selector 426 is supplied to a bus data out register 435 through driver 436 to the bus lines 410.

Data is read through the processor interface from the bus data lines 410 or the memory data lines 408. The bus data lines 410 are coupled through driver 440 to a bus data latch 441. The output of the bus data latch 441 is parity checked through logic 442 and coupled to line 429 as input to selector 428 for memory writes from the bus, and to selector 443 for writes into the read cache 416. Also, data on line 429 may be bypassed through read register 444 to selector 445 which supplies the driver 446 for data out lines 407 to the 29000 bus.

Data on line 408 from the core memory is supplied through driver 447 to the memory read latch 432. Parity checker 448 checks the output of register 432 which is supplied on line 431. Again, the data line 431 may be supplied through selector 443 into the read cache. The output of selector 443 is supplied to byte multiplexer 449. The second input to byte multiplexer 449 is the data out of the write buffer on line 427. The output of the byte multiplexer 449 is supplied into the read cache 416. The output of the read cache is supplied to the second input to selector 445. A parity checker 450 checks the data at the output of selector 445 and generates a data error signal on line 446 if an error is detected.

Data path control logic 451 controls the selectors and multiplexers in the data paths in response to the data path control signals [6:0] on lines 213 from the address array chip as shown in FIG. 4. These control signals are generally represented by line 452 which is coupled to the read cache 416 and the write buffer 417. Also, the data path control logic 451 generates the clock, error, and other status signals on line 411 to the bus.

As can be seen, the data path array provides a high speed interface between the bus 410 and the memory 408, responsive to addresses and control information supplied by the bus. The processor interface to the memory and the processor interface to the bus are decoupled from contention with the high speed bus-memory path by the read cache 416 and the write buffer 417.

The core memory controller internal architecture may be further understood upon review of FIGS. 6, 7, 8, 9, and 10, which illustrate internal partitioning of the CMC as well as fundamental cycle, data flow, caching, synchronization, arbitration and latency characteristics. Access to internal CMC configuration registers is discussed as ell.

Figure 6:
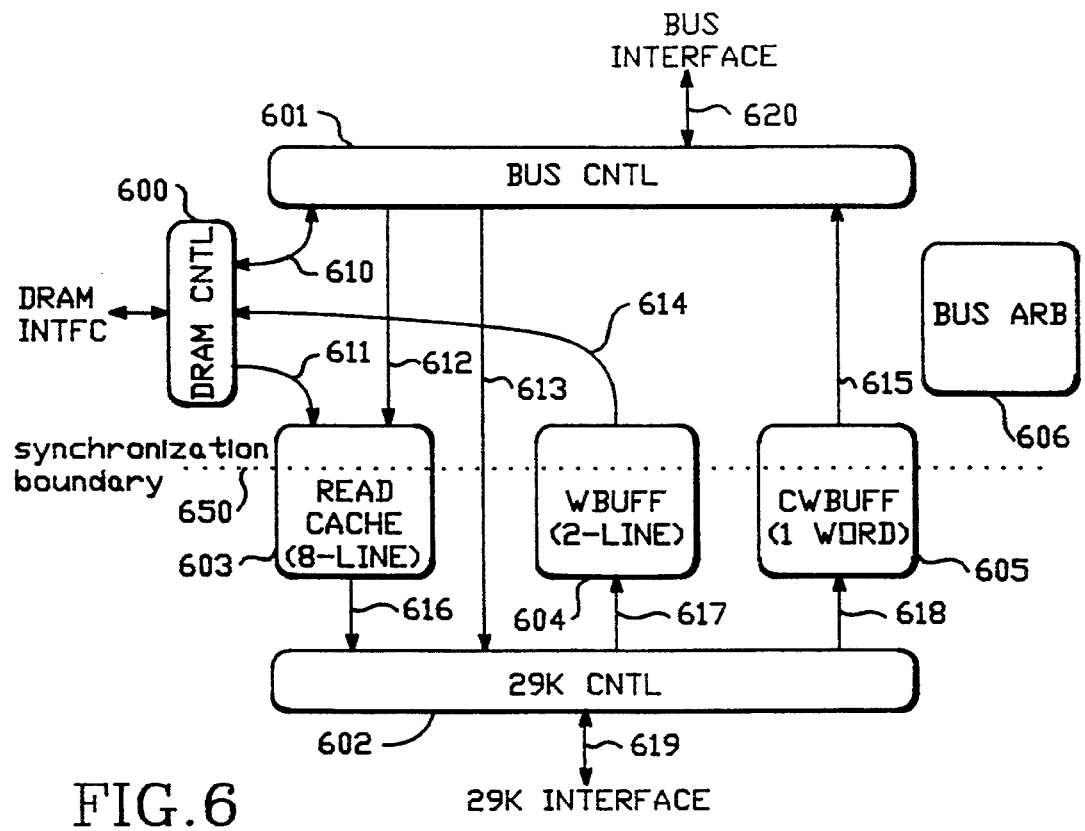
FIG. 6 illustrates data and control flow in the CMC according to one embodiment of the present invention.

The structure of the CMC may be reduced to functional blocks, or modules shown in FIG. 6. Each of these modules is physically split into halves contained in the address and data arrays. The halves of a major module will be kept in step by the BUS ARB module. The major internal modules of the CMC are:

| | |
|---|---|
| DRAM CNTL 600 | DRAM interface and DRAM read, write, refresh cycle control |
| BUS CNTL 601 | COREBUS interface, including config registers |
| 29K CNTL 602 | 29K Processor interface |
| READ CACHE 603 | 29K memory read access cache (8 ea. 4-word lines) |
| WBUFF 604 | 29K to DRAM write buffer (2 ea. 4-word lines) |
| CWBUFF 605 | 29K to COREBUS Memory or I/O write buffer (single word) |
| BUS ARB 606 | Arbitrates internal cycles between other modules. |

The CMC provides access to/from DRAM by either the bus or the processor. Processor accesses to DRAM are only through the 8-line read cache 603 or the 2-line write-back buffer 604. Processor read accesses to both DRAM and bus memory space are cached in a single READ CACHE 603. Processor read accesses to bus I/O space are not cached. A separate single-word write buffer 605 (CWBUFF) exists for posting processor write accesses to bus memory of I/O space.

The data flow paths in the CMC include the following by reference number:

| | |
|---|---|
| 610 | bus read/write dram (single word, pword or up to 8-word burst) |
| 611 | Read cache line fill from dram (4-word burst read) |
| 612 | Read cache line fill from bus mem space (4-word burst read) |
| 613 | 29K read from bus I/O space (single word, pword) |
| 614 | DRAM buffer write-back (up to 4 word, pword mix) |
| 615 | bus buffer write-back (single word, pword) |
| 616 | 29K read cache access (initial hit or as fill completes - word) |
| 617 | 29K posted DRAM write (word, pword - will wait if buffer full) |
| 618 | 29K posted bus I/O space write (word, pword - may cause wait) |
| 619 | 29K access (word, pword) |
| 620 | bus access (initiated by I/O or by 29K cycle) |

Implicit in the READ CACHE 603 and WBUFF 604 modules are the tag storage, comparison and validity checking logic required to manage caches. Also, both processor and bus write accesses into DRAM are snooped against the READ CACHE 603. Any write access to a DRAM location which is currently cached will cause invalidation of the cache entry. However, accesses to bus memory (which is in interface device memory such as configuration stores and not part of DRAM) are not snooped against the READ CACHE 603, even though those locations might be cached. Thus, the hardware guarantees READ CACHE coherency with DRAM, but not with bus memory. Of course, alternative systems may include snooping for bus memory accesses.

The majority of logic within the CMC is synchronous to the bus clock. This includes the BUS CNTL 601, DRAM CNTL 600, and BUS ARB 606 logic. The 29K CNTL 602, READ CACHE 603, and WBUFF 604 tag write logic is synchronous to the processor clock. Processor accesses to shared DRAM or bus memory must cross this "synchronization boundary" 650. Crossing the sync boundary 650 may result in wait-states to the processor when the data transfer does not hit the cache or other posting mechanism. In FIG. 6, the READ CACHE 603, WBUFF 604, and CWBUFF 605 are shown as bridging the synchronization boundary. Processor write accesses are posted whenever possible, allowing the processor to continue with other bus cycles while the DRAM or bus write access is pending; when posting mechanisms are full, subsequent accesses by the 29K will be held off until a buffer becomes available.

Figure 7:
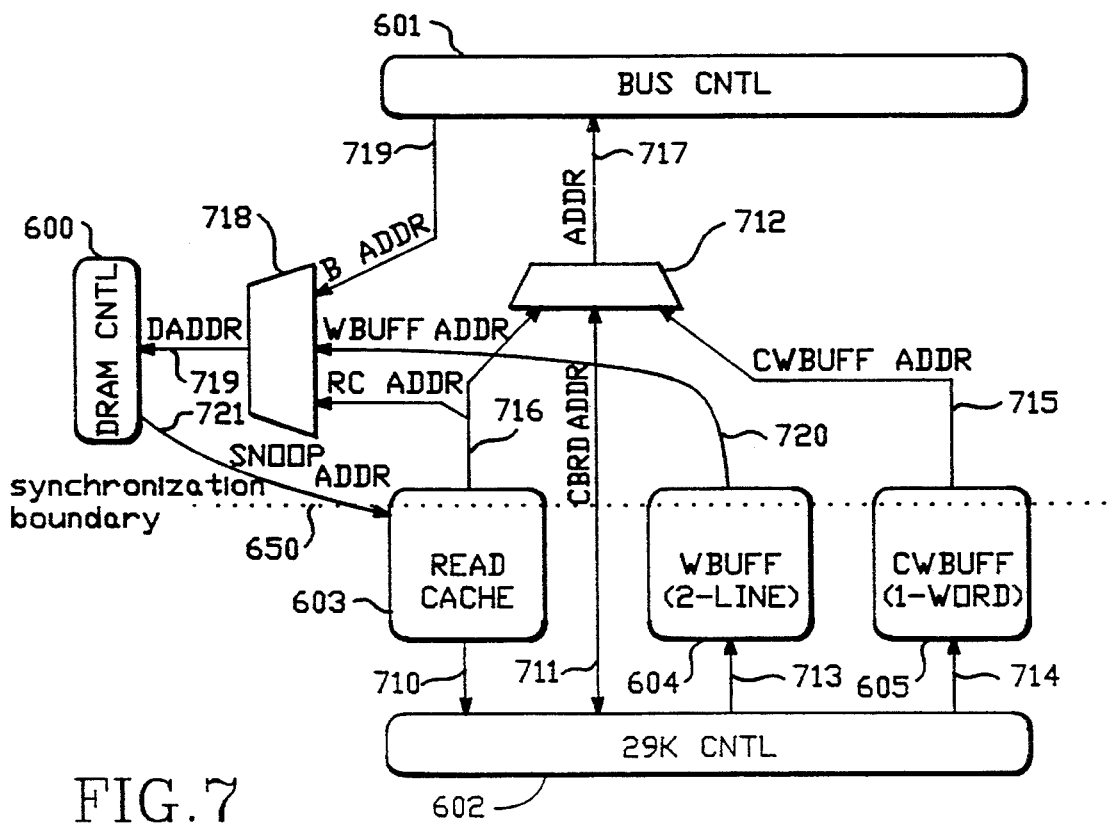
FIG. 7 illustrates address paths in the CMC according to one embodiment of the present invention.

Each module requesting a data transfer supplies, at least, a beginning address. FIG. 7 illustrate the address paths in the CMC. Only two modules are the object of transfer requests; DRAM CNTL 600 and BUS CNTL 601. In both cases, as the target module processes the request (e.g. FIG. 8 and FIG. 9), the BUS ARB 606 module supplies the control signals to multiplex the granted module's address to its input address bus (as well as those to control data flow).

FIG. 7 shows the address buses MUXed to the two target modules. Addresses to support data transfers from the READ CACHE 603 are supplied on line 710 to the 29K CNTL 602. The 29K CNTL 602 supplies addresses for a bus read on line 711 to bus address multiplexer 712. Also, the 29K CNTL supplies addresses on line 713 to the WBUFF 604, and on line 714 to the CWBUFF 605.

From the CWBUFF 605, addresses are supplied on line 715 to bus multiplexer 712. Also, addresses from the READ CACHE 603 are supplied on line 716 to the bus multiplexer 712. The output of the bus multiplexer 712 is supplied on line 717 to bus CNTL 601.

Multiplexer 718 supplies addresses to the DRAM on line 719. The inputs to multiplexer 718 include bus addresses across line 719 from BUS CNTL 601, addresses across line 720 from the WBUFF 604, and addresses on line 716 from the read cache 603.

Additionally, an address path 721 is provided for bus write transfers to be snooped against read cache contents. Since sequential bus burst write addresses are generated within the DRAM CNTL module, this snoop-bus is sourced by the DRAM CNTL 600 module and input to the READ CACHE 603 module.

Internal cycle arbitration logic is contained within the BUS ARB 606 module. DRAM cycles are processed according to a fixed-priority arbitration, with the priority highest-to-lowest being: refresh, bus transfer, write-buffer flush, read-cache fill. High priority requests are not allowed to lockout all other requests; a granted module is required to deassert its request for at least one clock between cycles, allowing other modules a chance to win arbitration. The order of cycles from the 29K to DRAM is generally controlled, so that there never arises a conflict with I/O devices reading from core bus. That is, if processor writes word A, then word B, no sequence of before, intermediate, or past reads via the bus will see the new value of B before the new value of A. If ordering is not maintained, it might be possible for bus to read new value of B, then old A.

Cycles targeting the BUS CNTL 601 are also processed on a prioritized basis, but generally defer to pending DRAM requests. For example, a requested read or write to bus I/O or memory space will not be allowed until any dirty write buffers are first written to DRAM. Bus I/O or memory reads will not be allowed until any pending DRAM or bus writes have completed. Also, cycles queued to BUS CNTL 601 are performed strictly in the order in which they are received.

Generally, 29K-initiated transfers may suffer synchronization overhead, whereas the bus will not. Both sides will contend for access into DRAM through BUS ARB 606 logic, with BUS CNTL 601 having the higher priority. Bursting is used where possible to reduce synchronization and arbitration overhead per word transferred, but isolated accesses must be concerned with latency for first access. To avoid pre-charge penalty on first access, the DRAM is not left in page mode at the end of a burst transfer. Bursts are never interrupted, and are of limited length: the bus may burst up to eight words, the 29K cache up to 4 words.

Any pending posted write to bus I/O space must be completed before the read takes place. Also, any writes posted to DRAM must complete prior to a read from the bus. A potential hi-latency condition exists for back-to-back bus I/O space writes. All other pending writes must be completed prior to the performance of each of the cycles. When a first 29K-to-bus posted write access is pending, a second 29K/CMC access may be held in wait-states while pending DRAM write buffers are flushed, the CWBUFF wins arbitration, the bus is acquired, and the posted bus transfer completes. Once the first posted access is complete, the second access may post and terminate.

The BUS ARB 606 resolves requests for access to DRAM, bus, and the CMC configuration registers. In addition to providing a synchronous REQUEST/GRANT protocol to contending devices, the BUS ARB controls address and data paths. Address paths are controlled through dedicated MUX control lines in the CMCA, while data path is controlled by data path control logic residing in the CMCD. The data path control bus (213 in FIGS. 4 and 5) is logically internal to the BUS ARB 606 module.

Internal cycle arbitration is prioritized, with bus accesses the highest priority. The priority ordering together with the arbitration rules ensure that safe ordering of cycles is maintained. Internal cycle requests (listed in priority order-)include:

| Requester | Direction | Target |
|---|---|---|
| BUS | R/W | DRAM |
| BUS | R/W | CMC Config registers (INIT Space) |
| BUS | W | INTERRUPT & EVENT REGISTER |
| READ CACHE (miss WBUFF) | R | DRAM |
| WBUFF | W | DRAM |
| READ CACHE (hit WBUFF) | R | DRAM |
| READ CACHE (miss CWBUFF) | R | BUS (MEM space) |
| CWBUFF | W | BUS (I/O or MEM space) |
| READ CACHE (hit CWBUFF) | R | BUS (MEM space) |
| 29K | R | BUS (I/O or MEM space) |
| 29K | R/W | CMC Internal Registers |
| READ CACHE PRE-FETCH | R | DRAM |

The bus should always be able to move data to/from DRAM; nothing that the 29K does locks the bus out of DRAM. That is, the hardware does not try to resolve race conditions between 29K software and BUS CNTL module data movement.

Other than the two bus-initiated requests, all cycles are in response to 29K activity. Priority is assigned to allow a careful ordering of transfers, but a strict ordering of 29K-initiated accesses is intentionally not maintained.

Whenever a 29K read cache miss hits a pending write buffer, then the write buffer must be allowed to flush prior to the read cache line fill. A miss of the write buffer is allowed to line fill prior to the posted write execution (therefore, out of order) to reduce read cache miss penalty.

The WBUFF has a request line for each of two buffers. The requests are never active at the same clock edge, but the next buffer may request access just as the first request is dropped, allowing it to participate in the subsequent arbitration. This allows two pending write buffers to flush prior to allowing a pending lower priority access to take place. Note, however, that pending bus request may win arbitration between the two write buffers.

A read cache hit causes the next line to be pre-fetched on a low priority basis. Posted accesses may be aborted once queued, and they may be preceded by higher priority accesses from the same module.

At the BUS ARB 606 module interface, all requests are synchronous. Requestors are clocked on the positive edge of BCLK. Arbitration and assertion of Grant (GNT) occurs on the negative edge, allowing the requestor to sample the GNT on the positive clock edges following assertion of its request (REQ).

The next request is granted at the same edge that releases the current request, unless there are no requests pending. Priority is resolved setting up to this edge, so that the winner is determined at the end of each cycle. It is fine for a different request from the same module to win the next arbitration, but any given request must be deasserted at least one full clock at the end of a cycle. This allows pending lower priority requests a chance to win arbitration.

Figure 8:
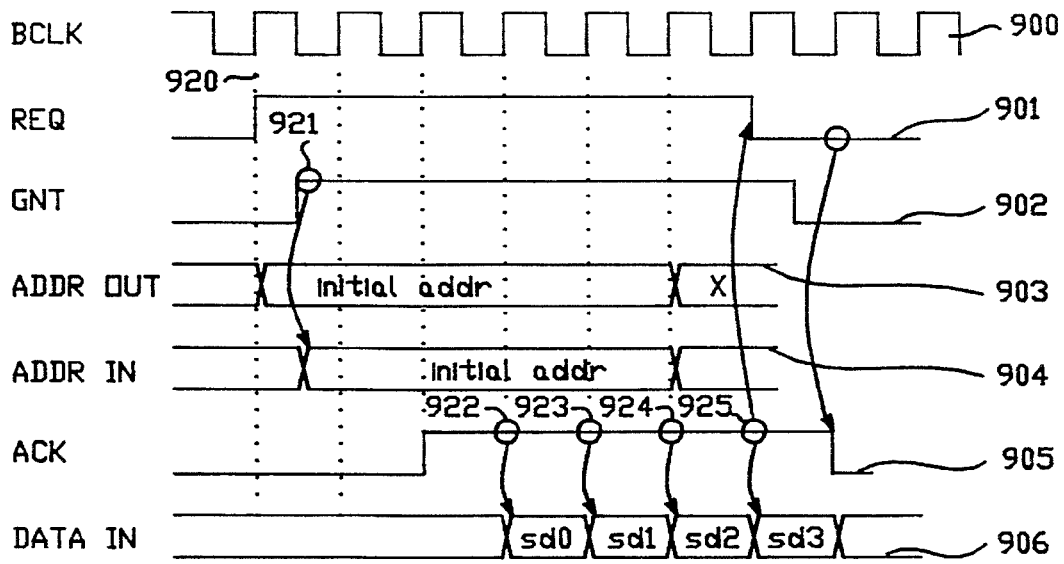
FIG. 8 illustrates an internal burst mode read cycle for the CMC according to one embodiment of the present invention.
Figure 9:
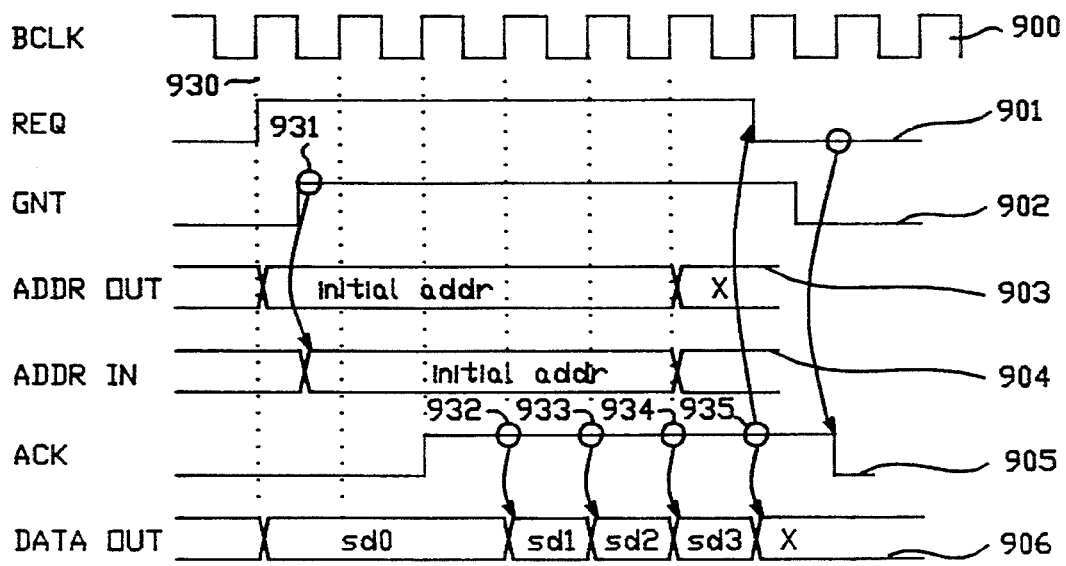
FIG. 9 illustrates an internal burst mode write cycle for the CMC according to one embodiment of the present invention.

FIGS. 8 and 9 provide an idea of internal cycle flow. Internal cycles are those taking place between major internal CMC modules, and are synchronous within the bus clock BCLK (trace 900). For each internal cycle, there will be a requestor and a target involved. A general handshaking protocol is used, with some variations specific to the characteristics of the modules involved in the transaction.

For an internal read cycle, the requestor asserts a dedicated cycle request (REQ, trace 901) to BUS ARB 606. At the same time 920, the first location to be read is available on the requestor's address output bus REQ ADDR OUT (trace 903). The BUS ARB performs arbitration, issues GNT (trace 902) and selects at 921 the requestor address through a MUX to TARGET ADDR IN (trace 904). The target, by monitoring all REQs and GNTs for potential requestors, notes a cycle condition and begins the cycle. The requestor monitors the target cycle acknowledge (ACK) line (trace 905) on each positive BCLK edge. At the receipt of an ACK condition (922–925), data (sd0–sd3) for the next clock period is available to be strobed by the requestor at its data in bus (trace 906). The requestor controls the duration of the cycle (i.e., the number of words transferred) by deasserting REQ at 925 once a sufficient number of ACKs are received. For all read cycles, the requestor need only assert a starting address; all burst read transfers will access consecutive and incrementing address locations.

For an internal write cycle as shown in FIG. 9, the requestor asserts a REQ at 930 to the BUS ARB. At the same time, both the beginning address (trace 903) and first data word or partial word sd0 (trace 906) are presented. The BUS ARB asserts the requestors's GNT at 931 following arbitration and selects the requestor's ADDR OUT to its ADDR IN (trace 904). Both the BUS ARB and the requestor monitor the ACK line (trace 905) from the target. In response to ACK (932–935), the BUS ARB informs the requestor (through DPATH CNTL bus) to present the next data word and hold it for a minimum of one complete BCLK cycle. The requestor terminates the cycle by dropping the REQ line at 935 after seeing the desired number of ACKs.

FIG. 9 shows a simple 4-word burst write that would be typical of a bus write into DRAM. On WBUFF writes, a new address must be supplied for each transfer, as the WBUFF module may write a mix of WORDS and PWORDS to non-sequential addresses within a line. Since lines are always within the same DRAM page, the non-sequential sequence can still be written using a burst DRAM sequence. Note: this implementation uses static column DRAMs (page mode would be equivalent) that can access any sequence of words within a DRAM page. If sequential burst mode DRAMs had been chosen, this out of sequence writing would not be possible.

The TARGET controls the duration of each word transfer by action of an ACK signal. The DRAM CNTL, as an example, might need to drop ACK while dealing with a page boundary crossing. In this case, burst mode is interrupted.

Additionally, a BWAIT line may be asserted by the bus when it is the REQUESTOR to DRAM CNTL. The DRAM CNTL as a TARGET samples the BWAIT at each positive clock edge and waits as appropriate.

Figure 10:
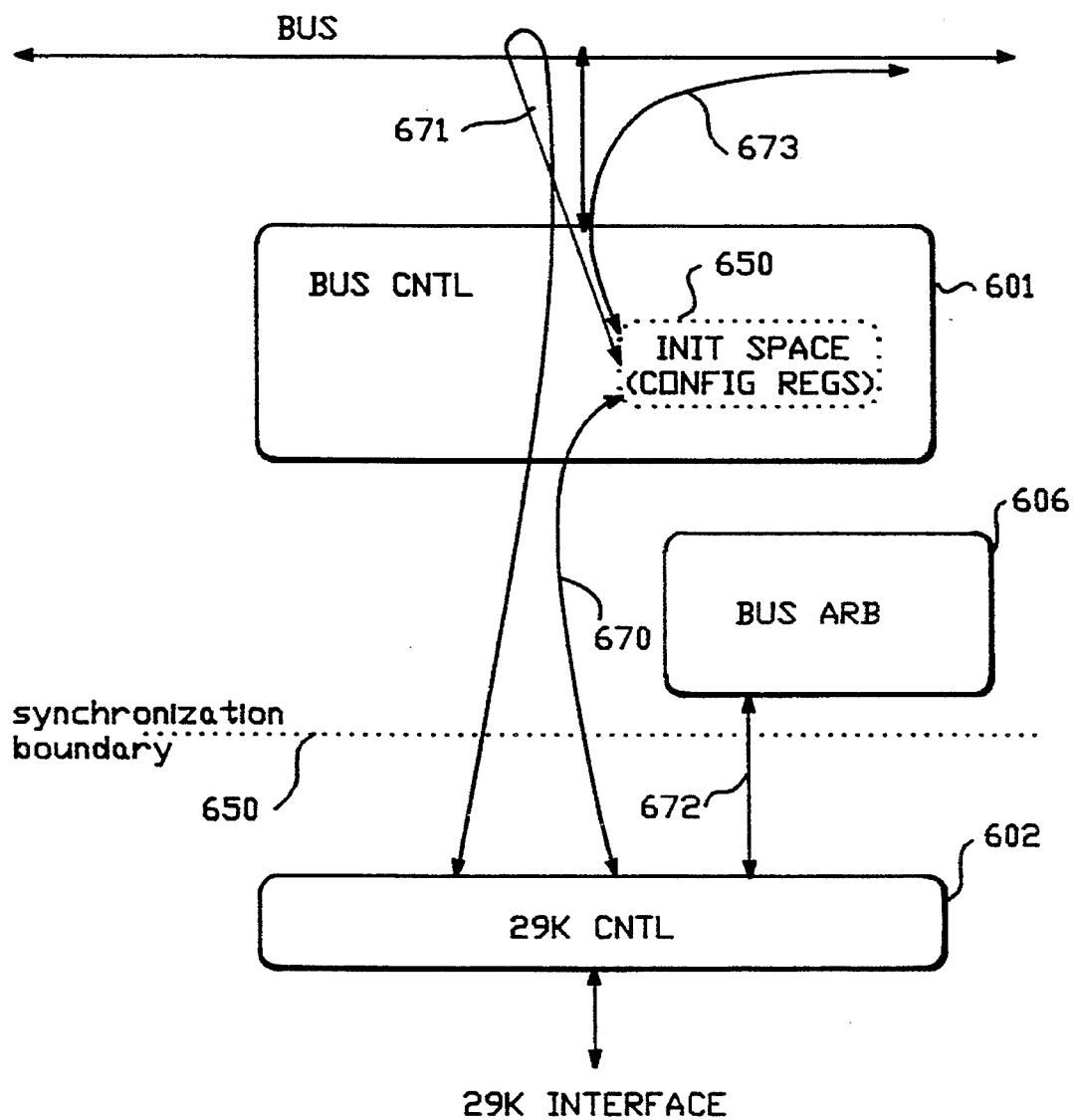
FIG. 10 illustrates the CMC configuration register read and write paths according to one embodiment of the present invention.

FIG. 10 illustrates CMC register access paths. When accessing control and status registers in the CMC, a 29K cycle is arbitrated by BUS ARB 606 to prevent sampling data which might be asynchronously affected by a concurrent internal cycle (that is, through arbitration the concurrent cycle possibility is eliminated). These registers reside in the DATAPATH CNTL logic, which is that part of the BUS ARB 606 module contained in the CMCD.

The CMC configuration registers 650 sit in the BUS CNTL 601 module, with their normally-static control line outputs used all over the place within the CMC. It is important that these register outputs are not changing mid-cycle, as cycle decode and control depends upon them to be truly static. Generally speaking, the 29K will write the registers 650 to configure the CMC, including such configuration data as bus master control registers and the like.

The internal register access paths involve data flow from the 29K CNTL 602 to the BUS CNTL (670), from the 29K CNTL 602 to BUS ARB (672), loop back from 29K CNTL to the bus to BUS CNTL (671) and from the bus to BUS CNTL (673).

Any 29K access to these registers 650 through local init space 670 (or through a bus loop-back path 671) will be seen and controlled by the BUS ARB module. Therefore, the cycle taking place is a safe one. However, init space accesses initiated from the bus will not be seen, nor will they be controlled by the BUS ARB 606 (if they were, you could run into a deadlock during loopback). Therefore, it is not legal for CMC init space to be written from the bus while a 29K DRAM access is in process or when the 29K is performing an init space bus loopback. This condition is somewhat obscure, since it will only arise in the case that multiple bus masters exist on a single bus and want to write into each other's init space. In that system environment, power-up initialization software will need to use semaphores to control things if/when these bus-initiated writes to CMC init space may take place.

Figure 11:
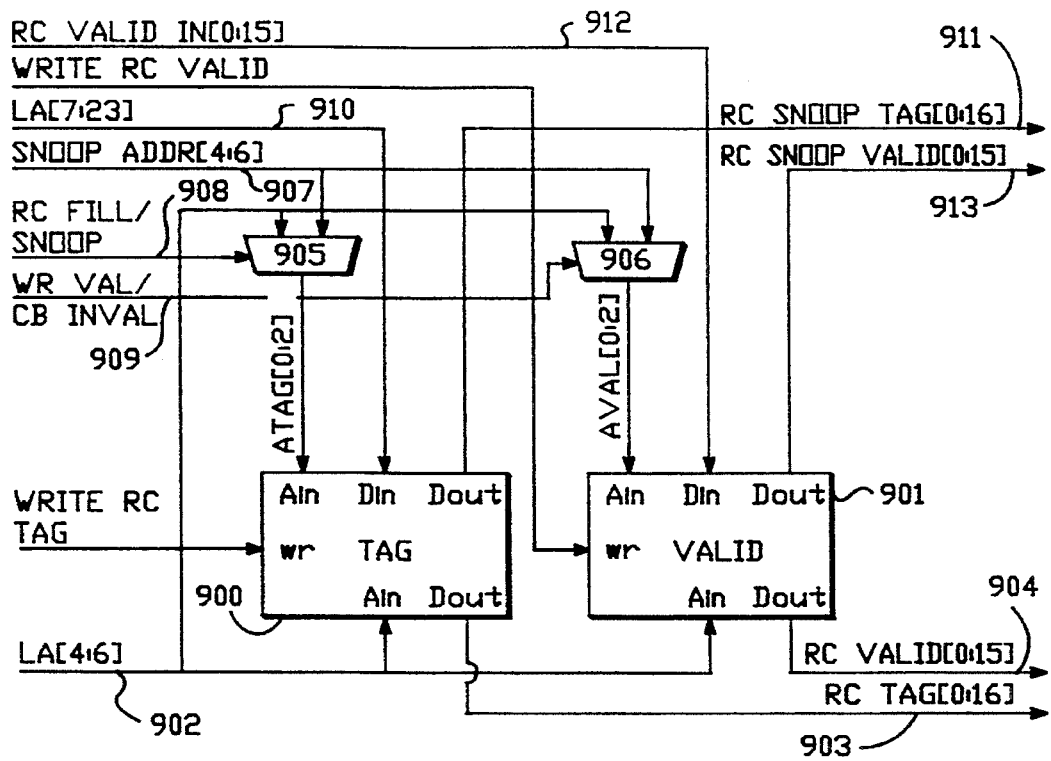
FIG. 11 is a block diagram of the read cache tag module for the core/memory controller.
Figure 12:
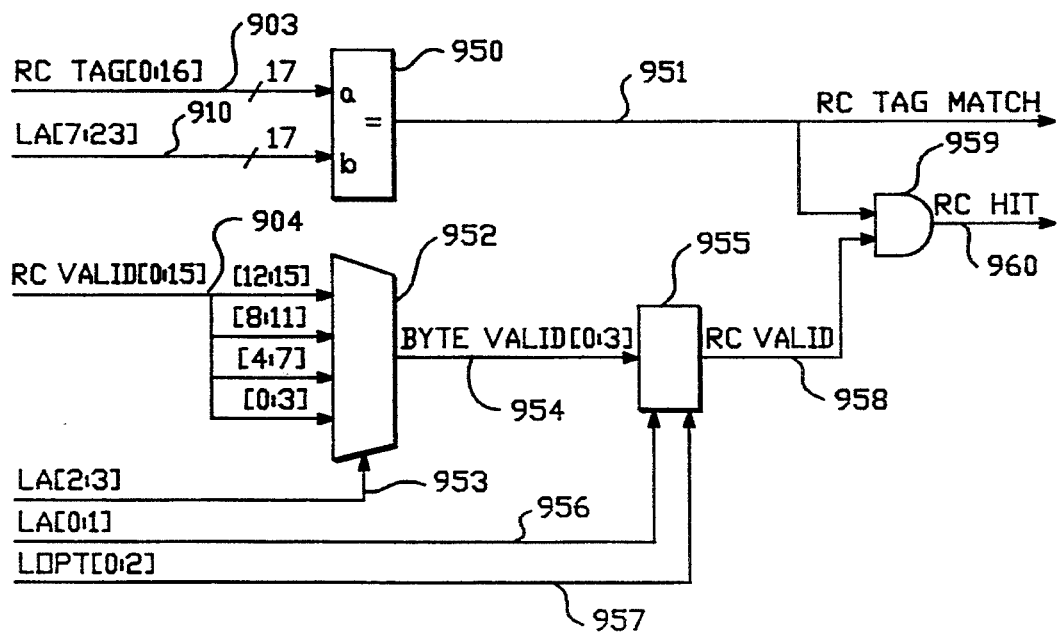
FIG. 12 is a block diagram of the read cache tag/valid check module for the core memory controller.

The READ CACHE 603 includes tag and tag check modules as shown in FIGS. 11 and 12. The READ CACHE 603 is a direct-mapped 8-line structure with byte-wise validity. The cache bridges the synchronization boundary between the 29K and the DRAM/BUS. Cache data are written synchronous to BCLK, and read asynchronously from the 29K side. All cache tag and validity bits are written synchronous to the processor clock, which ensures that the 29K will sample stable data.

The read cache tag module of FIG. 11 includes a tag memory 900 and a data valid memory 901. The tag and data valid memories are dual port static RAMs including a read/write port on the CMC internal side and a read-only port on the 29K side. The read-only port of each memory 900, 901 is addressed by logical address (4:6) on line 902. The data out on the read-only side is supplied from the tag memory 900 on line 903, and from the valid memory 901 on line 904.

The read/write side of the tag memory 900 and valid memory 901 are addressed by the outputs of respective multiplexers 905. The inputs to these multiplexers include the logical address from line 902 and the snoop address on line 907 (corresponding to address path 721 of FIG. 7). A control signal read cache fill/snoop on line 908 controls the multiplexer for the tag memory 900. The control signal "write valid" or "bus invalidate" on line 909 controls the multiplexer 906 for the valid memory 901.

The data into the read/write side of the tag memory 900 is supplied from the logical address lines (7:23) on line 910. The data out of the tag memory 900 on the read/write side supplied on line 911 as the read cache snoop tag. For the valid bit memory 901, a read cache valid input line 912 supplies the data in. The output data is supplied on line 913 as the read cache snoop valid signals.

Memory accesses by the 29K are compared against read cache tag contents from the read-only side of the tag. A read which hits the cache will result in a two-clock cycle to the 29K. A write which matches a read cache tag entry will cause byte-wise invalidation of the addressed cache entry.

The tag (cached block address) is written only by a line fill cycle of four words. The validity bits may be written by: a line fill, 29K write invalidation, or a bus write invalidation. The bus invalidation is done byte-wise for a single cycle transfer, and line-wise for burst transfer.

The RC tag module outputs, RC VALID (0:15) on line 904 and RC TAG (0:16) on line 903, are input to the RC TAG/VALID CHECK module of FIG. 12 for comparison against the location addressed by the current 29K cycle. The read cache tag on line 903 is supplied to a comparator 950. The second input to the comparator is the logical address bits 7:23 on line 910. If the tag matches the logical address, then a read cache tag match signal is asserted on line 951.

The read cache valid signals on line 904 are supplied to multiplexer 952. The multiplexer 952 is controlled by logical address bits 2:3 on line 953. Four bits of byte valid data are supplied on line 954 out of the multiplexer 952 into logic 955. Other inputs to logic 955 includes logical address bits 0:1 on line 956 and the LOPT (0:2) signal on line 957. The output of the logic 955 is the read cache valid signal on line 958. The read cache valid signal on line 958 and the read cache tag match on line 951 are supplied as inputs to AND gate 959. A read cache hit signal is supplied on line 960 if both signals are true. Logic 955 compares the byte validity with the access size and address (1:0) to determine if all the bytes actually being accessed are valid. For a 32 bit read, all 4 byte validity signals must be active. For 16 bits, the two upper or lower byte validity bits must be active. For a byte read only, the correct byte validity bit must be active.

An RC HIT condition 960 is the result of a matching address and all pertinent validity bits true for the access. This condition allows completion of the 29K read cycle, either at first hit or following a line fill. If RC HIT is false, the processor cycle will wait until the validity bits are written true by the resultant line fill.

29K memory write cycles will look at RC TAG MATCH only, with no attention paid to the current state of the validity bits. A match will result in one, two, or four validity bits reset to invalidate the WORD/PWORD entry.

Bus cycles will be snooped on the R/W side of the RC tag, and this may occur concurrent with 29K cycles from the other side. There is no contention between bus snooping and read cache fills, since they are mutually exclusive conditions.

The bus snoop module compares snoop address bits with tag entries. A match will result in one of two types of bus invalidation cycle requests: when the bus transfer length is one, a single byte-wise invalidation within a word occurs. When the bus transfer length is greater than one, a request for three-line invalidation is asserted: that is, invalidate three consecutive lines whether the next two match anything or not. This covers the worst case 8 word-burst crossing 3 lines.

Arbitration is required to control which of the possible concurrent accesses may perform invalidation. 29K-side write invalidations will be far more common than bus invalidation, and the 29K side is given the priority and is default. Therefore, the infrequent bus RC invalidation may have to wait a bit. Most often, the condition will be a miss and the bus access speed will be unaffected. Should invalidation be required, the first is posted to the RC_TAG, further invalidations will cause delay while earlier requests are completed. Likewise, a 29K memory write which hits the read cache will invalidate read cache. It is deemed unlikely that the system software will write a value and then read it back right away (in which case updating the read cache instead of invalidation might be a worthwhile strategy).

A read cache line fill module accepts requests from the RC tag control module which are synchronous to the processor clock. The requests are synchronized to bus clock and presented to the BUS ARB 606 module. When the cycle is granted, the module monitors the appropriate ACK line and drops the REQ when the proper number of transfers have taken place.

Also, the line fill module posts a line validate request back to the RC tag control module, resulting in a write of the line validity bits and completion of any outstanding 29K read cycle from the associated line. In this case, the REQ/ACK protocol is across the sync boundary.

29K writes are queued in a 2-line write buffer WBUFF 604. The management strategy is to ping-pong the use of the buffers. At any time, a line may be: empty, dirty, or posted for write. Once a line is posted for write, the 29K is denied access until the write to DRAM is completed. The ordering of writes to DRAM is strictly maintained. Bus accesses are not snooped against WBUFF (if a write-to-memory race is that close it is not possible to determine who should win); if the bus write hits a posted line, both writes will occur with the posted line following the bus.

Write control logic will alternately post the lines for write-back as they are written by the 29K. If both the buffers are empty, then a 29K word/partial-word write access will write the line and tag, write control will immediately post the present line, and the next access will go to the next line. If there is one buffer posted and another empty, then a 29K write access will set dirty-bit(s) in the present line, but it will not be posted until the next buffer is free. Should an access occur when one line is posted and another is dirty, then a tag check occurs. A hit allows the 29K to write into the already-dirty line, and a miss causes the 29K to be held in wait stats until a buffer comes free.

The purpose of the write buffer is to give the processor an apparent high bandwidth into relatively slow, hi-latency core memory. Data are posted to the write buffer quickly, allowing the processor to continue operation as the data are flushed to DRAM.

The two buffers, called WBUFFA and WBUFFB, are identical. The buffers are used in a ping-pong fashion, so that the processor may be filling one of the buffers as the other is flushing. Each is a four-word buffer with an associated single tag register and byte-wise validity. This structure is designed to be most efficient when the processor is performing a series of writes which hit the same line in memory, or are sequential accesses.

When the processor writes a location which is resident in the CMC read cache, that location within the read cache is marked invalid when the data is written into WBUFF. This and a higher priority WBUFF request to bus ARB 606 ensures cache coherency and that a processor write and read-back will never render stale data.

The buffer status is kept as two bits of information: dirty and posted. The definition of dirty is: something has been written into the buffer and not yet flushed to DRAM. Posted means that the buffer is not available for further fills, as it has been queued for flush. An empty buffer will never be posted for flush, so that if the buffer is marked "posted" it will always also be marked "dirty."

When both buffers are empty and a processor write occurs, the data are written into WBUFFA which is immediately marked dirty and posted. If a second write occurs while WBUFFA is still marked as posted, then the write data will be directed to WBUFFB, which is marked dirty but not posted.

The rules of buffer management are this:

if both buffers are empty, then a DRAM write is directed to WBUFFA which is immediately posted for flush;

if one buffer is empty, that buffer will be written and will be available for further hits until it is posted;

if a buffer is dirty and not posted, only the completion of the flush of the second buffer will cause the first to be posted to flush;

should a flush acknowledge and a second buffer hit occur at once, the second buffer is written and posted simultaneously.

III. Example Driver Architecture (FIGS. 13–14)

A driver residing in the 29K memory space for an ethernet interface device is described by way of example to illustrate the partitioning of data and control structures in the core memory from all other instructions, tables, and data necessary for the internetworking functions. The internetwork device may perform bridging functions and/or routing functions. These include a transparent bridge operations and/or subnet layer operations involved in these functions according to well established industry standard routines. These subnet layer and transparent bridge functions are entirely contained within the 29K instruction and data memory space.

An ethernet driver in the 29K memory has the architecture shown in FIG. 13.

The subnet layer and transparent bridge module 800 is coupled to receive and transmit event drivers, including:

EMD_RCVINT() 801 for the interrupt which sets a receive interrupt bit in the interrupt register of the core memory controller.

EMD_XMTINT() 802 for the interrupt which sets an interrupt bit in the interrupt register.

EMD_RCVEVNT() 803 for the receive event bit set in the event bit register.

EMD_XMTEVNT() 804 for the interrupt bit set in the event register.

Also, included is an EMD_XMIT() module 805. Again, these modules reside completely in the 29000 local memory 850, with all supporting tables and the like.

Loaded in the core memory 851 to support the driver functions are a receive ring 806 storing a ring of receive data table entries, a transmit ring 807 storing a ring of transmit data table entries. These entries point to respective buffers, including buffers 808-1, 808-2, and 808-3 served by the receive ring, and buffers 809-1, 809-2, and 809-3 served by the transmit ring 807. In addition, to support the ethernet interface device, pointers BD to buffer descriptors are created at system initialization time in local 29K memory 850. Thus, pointers 810-1 through 810-3 are included in the local memory for buffers 808-1 through 808-3. Similarly, pointers 811-1 through 811-3 are included for buffers 809-1 through 809-3.

The configuration memory space 852 of the ethernet module on the bus, for an ILACC device, will include register CSR0 through CSR31, generally 812, and configuration registers 813 involved in the bus interface.

FIG. 14 illustrates the interrupt architecture for the driver. In the ethernet system, the network interface device will include an ILACC chip 880. This chip includes pins INTR1 which indicates receive events and pin INTR0 which indicates transmit events and errors. These pins are coupled to a bus interface module 881 which transfers signals on the ILACC interrupt pins across bus 882 to an event register 883 in the core memory controller. The two interrupt pins on the ILACC chip 880 are allocated specific bit positions in the event summary register 883. Thus, the 29K kernel can poll the event summary register 883 in the core memory controller to detect events that need service.

The core memory controller also has an interrupt summary register 884. Interrupts are loaded into the interrupt summary register through the bus interface device 881. These interrupts are generated when the ILACC chip 900 generates an address 885, 886 which is stored in the configuration store of the interface 881. When an address match occurs on the interface 881, an interrupt signal is supplied across the bus 882 to the interrupt summary register 884. A logical OR of the interrupt summary register 884 is supplied to the 29K level 3 interrupt input.

An event in the event summary register 883 is very similar to an interrupt up to the point where it reaches the CMC. At that point events are distinguished by the fact that they do not interrupt the 29K processor, whereas interrupts cause an interrupt on the *INTR3 pin of the 29K. In the case of the ILACC, the bus interface 881 will be configured by the ethernet driver (EMD) so that any input interrupt (i.e., on INTR0 or INTR1) will be passed as an event, not an interrupt. Such events would be a packet received or transmitted, or an error condition on the ILACC.

It is also possible to program the interface 881 to generate an interrupt or event for a buffers-low condition. This mechanism is set up by firstly providing the address of an ILACC control structure to the register 885 or 886 to monitor. Normally this address would point to a buffer descriptor table entry in core memory. For receive, the entry would be chosen to be close to the last RDTE set up to be available for input. An interrupt or event is caused when that RDTE is either read or written by the ILACC. Normally the mechanism will be set up to generate an interrupt, and the processing by the EMD for that interrupt will restock the input queue. A similar technique can be used to recycle buffers from the transmit queue, using TDTE locations.

Interrupts are summarized into the interrupt register 884, which has one bit per interrupt source, and 32 bits total. Similarly events are summarized into the event register 883. Thus the encoded priority level chosen when configuring the interface device 881 to determine which bit will be set in the interrupt or event registers on occurrence of that interrupt/event. The ethernet driver has two bits allocated for each module, in each of these registers. When an event occurs, the bit corresponding to that event source will be set in the event register. Software can prioritize different sources, but currently does round robin scheduling.

From the programmer's perspective, events are a lower priority condition in the 29K kernel than interrupts, although they are still higher than anything else. Interrupts will be processed immediately when they occur, provided they are not masked. Events are scheduled to run before any normal processing other than interrupts. So for the ILACC, the system will be configured by the EMD to generate events for packets received or transmitted or for ILACC errors, and to generate interrupts for buffer-low conditions. In other words all ILACC-related conditions will cause an event which will be processed in the next scheduling cycle. A buffer-low condition will be processed immediately via interrupts. As long as the driver can keep up with events, no interrupt overhead occurs.

So the ILACC module will be configured as follows:

1. One event bit in the event register 883 will indicate frames have been received.

2. Another event bit in the event register 883 will indicate frames have been transmitted or errors have occurred.

There are several bits in ILACC registers (CSR0 and CSR4 which indicate the cause of the event if the ILACC is the source:

a. TINT—indicates that a transmit has completed and the OWN bit has been toggled.

b. BABL—indicates that the transmitter timed out doubtless due to a packet being too long.

c. MISS—indicates that the receiver missed a packet because it did not own a receive buffer.

d. MERR—indicates a memory error has occurred when the chip is the bus master. This will occur if an attempt is made to read or write to an address which is not in the allocated control or data windows.

e. IDON—indicates that the chip has completed initialization.

3. One interrupt bit in the interrupt register 884 will indicate a buffers-low situation.

4. Another interrupt bit in the interrupt register 884 will indicate used buffers ready to be recycled.

One of the EMD's initial duties prior to self-tests will be to negotiate with the configuration manager to get assigned its two bits in each of the interrupt and event registers. Then system processing for *INTR3 interrupts will flow somewhat as follows. The interrupt will be signalled by the ethernet module and also a specific bit will be set in the interrupt register. The kernel interrupt handler can interrogate this register to determine which module triggered the interrupt. Also associated with each bit is an interrupt handler routine (and a priority). The same setup applies for the event register and its bits. The net effect of the above is that the EMD will have four handler entry points as shown in FIG. 13, defined as follows:

emd_rcvint(): for the interrupt which sets the RINTR bit in the interrupt register.

emd_xmtint(): for the interrupt which sets the INTR bit in the interrupt register.

emd_rcvevnt(): for the RINTR bit set in the event register.

emd_xmtevnt(): for the INTR bit set in the event register.

The interrupt and event interfaces for the EMD module are summarized for example below.

emd rcvint(interface); 801

This is the entry point for an interrupt on a receive buffers low interrupt. The processing for this entry point will be done with interrupts disabled, so it is intended to be as brief as possible. The EMD will configure the receive descriptor table entries (RDTEs) such that the interrupt processed by this entry point will only occur when the unused buffer count is low. Under normal processing, the EMD will restock from the event entry point, emd_rcvevnt, and reset the interrupt buffer address. Thus the driver will only come here when the load is so heavy that the kernel has not been able to service the event queue to call the receive event handler. The routine will perform a minimum restock of the receive queues, by calling a kernel routine (which will have appropriate semaphores) to get buffers. It will then set a new address into the receive interrupt mechanism in the CMPI.

emd xmtint(interface); 802

This is the entry point for a transmit buffers restock interrupt. This entry point will be used as a safety valve when the system is too busy to process transmit events. The transmit buffer descriptor address which is a long way down the transmit BDT from the current insertion position is monitored at the ethernet interface. When called, this routine will simply release buffers from the transmit queue and then reset the transmit address much further ahead again. Under normal circumstances, this entry point should not be needed as its function should occur from the transmit event entry point. At this time, the EMD will clear the interrupt bit.

emd rcvevnt(interface); 803

This entry point will process the ILACC receive descriptor queues. The routine will consist of a loop which is executed a system-configurable number of times. Each iteration will pluck a packet from the receive queue and perform state processing on that packet. The action generated will be based on the destination of the packet and the type of packet, etc. The action will dispose of the packet appropriately to the upper (client) queues.

Finally, the routine will perform receive queue restocking if necessary.

emd xmtevnt(interface); 804

This entry point is for transmit or error events. The EMD will perform two duties in this routine, one of them on each call, the other on every Nth call where N is system-configurable. The first duty will be to process the transmit queue and unlink all transmitted buffers. They will be returned to the kernel. Also, the transmitted buffer's flags (e.g., BUFF, NCAR, etc.) will be scanned for any transmission errors. The duty to be performed every Nth iteration will be to access the ILACC registers and other interface registers to see if any unusual interrupts/events have occurred. This is expected to be fairly expensive operation in terms of clock cycles. As mentioned earlier, the event bits in the event register are set for not only completed transmissions but also any error interrupts that may have occurred. Due to the expected extremely low frequency of the error bits being set and the high processing cost, the EMD will not scan these registers each XMIT event. With N set to at least 16 and as high as 32, it is expected that the processing cost will be much lower since this will only occur once for 16 or more transmitted packets. At this time, the EMD will clear the interrupts in the ILACC and the CMPI (in that order).

Requests to send the packet will be performed by: emd xmit(pkt,dest,src,force) 805. The EMD transmit routine will simply perform state processing on the packet passed in the call. This will almost invariably result in the packet being queued to the appropriate ethernet module. No filtering will be done at the driver level. This is entirely the responsibility of TB 800.

The EMD receive processing has essentially been covered in driver entry points. The two routines involved are: emd__rcvint(interface); and end__rcvevnt(interface).

As discussed above, the EMD receive processing will simply involve dequeueing packets from the ILACC receive descriptors (RDTEs) and passing them via state processing to the appropriate client. What was not discussed there was the algorithm to be used to identify the destination client.

This will be done as follows:

```
if mode is promiscuous (i.e. bridging)
then
    send to TB(tb_rcv(bd_ptr,interface))
    exit;
if mode is non-promiscuous
then
    if unicast and not addressed to this box
        ERROR (of some sort);
    else
        send unicast, multi-cast and broadcast to SNL; (snl
        rcv_client())
    exit;
```

This minimizes as much as possible the EMD's scanning of received packets.

IV. Conclusion

The present invention provides an N-way internetworking device which can perform bridge, router, and gateway services with very high performance. The product improves on the performance features of previous generation internetworking products. The system is based on the concept of a core memory which is optimized for transfers of I/O data between network interface devices and the core memory. The processor performing the internetworking routines is able to execute with high performance without interference by input/output processes of the network interface devices. The processor needs only to go to the core memory occasionally for such control information necessary to perform its services.

Conversely, the input/output transfers to the core bus never interfere with the processor's performance. Input/output operations do not "take over" a processor bus and stall it while the I/O device transfers into a buffer.

Further enhancements are provided to the processor to core memory interface which decouple the processor from contention with I/O data transfers from the network interface devices. Thus, a read cache and write buffer are used so that the majority of processor accesses to core memory, or to configuration information in the network interface devices are decoupled from the high speed transfer path between the networks and the core memory.

This architecture allows the processor to be optimized to make decisions based on a local database of information, without concerning itself with moving any data. All data movements are done by the core memory controller and network interface device interfaces. The main processor is kept busy, without interference with its operation by the I/O stream of data using the core memory which stores only data needed by the network interface devices. This way, the main processor need only use this memory when a packet has to be inspected. Local routing tables, other housekeeping data, driver software, and the like is kept in a memory within the processor subsystem isolated from the core memory.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. An apparatus for managing data flow among a plurality of input/output devices, comprising:

a core memory storing I/O data and control structures needed by the input/output devices;

a processor, including local memory isolated from the core memory and storing control information and instructions used by routines executed by the processor managing data flow among the input/output devices;

a first memory interface responsive to the plurality of input/output devices, including means, in communication with the plurality of input/output devices and the core memory, for transferring I/O data and control data between the input/output devices in the plurality of input/output devices and the I/O data and control structures in the core memory;

a second memory interface responsive to the processor, including means in communication with the processor and the core memory, for transferring control data between control structures and I/O data in the core memory and the processor, and;

a configuration interface, coupled with the plurality of input/output devices and the processor, for transferring control and status information concerning control structures and I/O data in the core memory between the plurality of input/output devices and the processor.

2. The apparatus of claim 1, wherein the second memory interface includes a read cache for reads by the processor from the core memory.

3. The apparatus of claim 1, wherein in the second interface includes a buffer for writes from the processor to the core memory.

4. The apparatus of claim 1, wherein the second memory interface includes:

means, coupled to the processor and the core memory, for decoupling processor accesses to the core memory from contention with transfers between the core memory and the plurality of input/output devices through the first memory interface.

5. The apparatus of claim 1, wherein the core memory stores only I/O data and control structures needed by the plurality of input/output devices.

6. The apparatus of claim 1, wherein the second memory interface includes:

means, coupled to the processor, the plurality of input/output devices and the core memory, for decoupling processor accesses to the plurality of input/output devices and to the core memory from contention with transfers between the core memory and the plurality of input/output devices through the first memory interface.

7. The apparatus of claim 1, wherein the means in the first memory interface for transferring data between the plurality of input/output devices and the core memory comprises a bus coupled to the plurality of input/output devices.

8. An apparatus for managing an interface among a plurality of network interface devices coupled to respective networks communicating packets of I/O data, comprising:

a bus coupled to the plurality of network interface devices;

a core memory;

a processor including local memory storing control information and routines executed by the processor involved in moving packets of I/O data among the plurality of network interface devices;

a bus-memory interface, including means, coupled to the bus and the core memory, for transferring packets of I/O data and control data used by the plurality of network interface devices between the bus and the core memory;

a processor-memory interface, including means, coupled to the processor and the core memory, for transferring control data used by the plurality of network interface devices between the core memory and the processor, and;

a configuration interface, coupled with the bus and the processor, for transferring configuration information concerning control structures and I/O data in the core memory between the plurality of network interface devices and the processor.

9. The apparatus of claim 8, wherein the processor-memory interface includes a read cache for reads by the processor from the core memory.

10. The apparatus of claim 8, wherein in the processor-memory interface includes a buffer for writes from the processor to the core memory.

11. The apparatus of claim 8, further including:

means, coupled to the processor, the bus and the core memory, for decoupling processor accesses to configuration information in the plurality of network interface devices and to the core memory from contention with bus-memory interface transfers between the core memory and the plurality of network interface devices.

12. The apparatus of claim 8, wherein the core memory stores only I/O data and control structures needed by the plurality of network interface devices.

13. The apparatus of claim 8, wherein the processor-memory interface includes:

means, coupled to the processor and the core memory, for decoupling processor accesses to the core memory from contention with bus-memory interface transfers between the core memory and the plurality of network interface devices.

14. The apparatus of claim 8, wherein the processor-memory interface includes:

a read cache, coupled with the core memory, for storing words from a plurality of sequential addresses in the core memory for reads by the processor from the core memory; and a cache manager maintaining words in the read cache with burst mode transfers from the plurality of sequential addresses in core memory.

15. The apparatus of claim 8, wherein the processor-memory interface includes:

a write buffer, coupled to the core memory, for storing words for writes from the processor to plurality of sequential addresses in the core memory; and a buffer manager writing words from the write buffer to the core memory with burst mode transfers to the plurality of sequential addresses in the core memory.

16. An apparatus for managing an interface among a plurality of network interface devices coupled to respective networks communicating packets of I/O data, comprising:

a bus coupled to the plurality of network interface devices;

a core memory storing only packets of I/O data and control structures needed by the plurality of network interface devices;

a processor including local memory isolated from the core memory storing routines executed by the processor and internetwork control information involved in updating control structures or control fields in packets of I/O data to direct movement of packets of I/O data among the plurality of network interface devices;

a bus-memory interface, including means, coupled to the bus and the core memory, for transferring packets of I/O data and control structures used by the plurality of network interface devices between the core memory and the bus;

a processor-memory interface, including means, coupled to the processor and the core memory, for transferring data to or from control structures or control fields in packets of I/O data between the core memory and the processor; and a processor-bus interface, including means, coupled to the processor and the bus, for transferring configuration information concerning control structures and I/O data in the core memory between the plurality of network interface devices and the processor.

17. The apparatus of claim 16, wherein the processor-memory interface includes:

means, coupled to the processor and the core memory, for decoupling processor accesses to the core memory from contention with bus-memory interface transfers between the core memory and the plurality of network interface devices.

18. The apparatus of claim 17, wherein the means for decoupling includes a read cache, coupled with the core memory, for reads by the processor from the core memory.

19. The apparatus of claim 18, further including a cache manager maintaining data from a plurality of sequential addresses from the core memory in the read cache.

20. The apparatus of claim 17, wherein the means for decoupling includes a write buffer, coupled with the core memory, for writes from the processor to the core memory.

21. The apparatus of claim 17, wherein the means for decoupling includes:

a read cache, coupled with the bus and the core memory, for reads by the processor from the core memory and the bus; and a write buffer, coupled with the core memory, for writes from the processor to the core memory.

22. The apparatus of claim 21, further including a cache manager maintaining data from a plurality of sequential addresses from the core memory in the read cache.

23. The apparatus of claim 16, further including:

means, coupled to the processor, the bus and the core memory, for decoupling processor accesses to configuration stores in the plurality of network interface devices and to the core memory from contention with bus-memory interface transfers between the core memory and the plurality of network interface devices.

24. The apparatus of claim 23, wherein the means for decoupling includes a read cache, coupled with the bus and core memory, for reads by the processor from configuration stores in the plurality of network interface devices and from the core memory.

25. The apparatus of claim 24, further including a cache manager maintaining data from a plurality of sequential addresses from the core memory or configuration stores in the plurality of network interface devices in the read cache.

26. The apparatus of claim 23, wherein in the means for decoupling includes a write buffer, coupled with the bus and the core memory, for writes from the processor to configuration stores in the plurality of network interface devices and to the core memory.

27. The apparatus of claim 23, wherein the means for decoupling includes:

a read cache, coupled with the bus and core memory, for reads by the processor from configuration stores in the plurality of network interface devices and from the core memory; and a write buffer, coupled with the bus and the core memory, for writes from the processor to configuration stores in the plurality of network interface devices and to the core memory.

28. The apparatus of claim 27, further including a cache manager maintaining data from a plurality of sequential addresses from the core memory or configuration stores in the plurality of network interface devices in the read cache.

29. The apparatus of claim 16, wherein the processor-memory interface includes:

a read cache, coupled with the core memory, for storing words from a plurality of sequential addresses in the core memory for reads by the processor from the core memory; and a cache manager maintaining words in the read cache with burst mode transfers from the plurality of sequential addresses in the core memory.

30. The apparatus of claim 16, wherein the processor-memory interface includes:

a write buffer, coupled to the core memory, for storing words for writes from the processor to plurality of sequential addresses in the core memory; and a buffer manager writing words from the write buffer to the core memory with burst mode transfers to the plurality of sequential addresses in the core memory.

* * * * *